United States Patent
Sahadevan et al.

(10) Patent No.: US 11,724,234 B2
(45) Date of Patent: Aug. 15, 2023

(54) MULTILAYER THIN FILM NANOCOMPOSITE MEMBRANES PREPARED BY MOLECULAR LAYER-BY-LAYER ASSEMBLY

(71) Applicant: SOUTH DAKOTA BOARD OF REGENTS, Pierre, SD (US)

(72) Inventors: Rajesh Sahadevan, Dakota Dunes, SD (US); Todd J. Menkhaus, Dakota Dunes, SD (US); Hao Fong, Dakota Dunes, SD (US)

(73) Assignee: SOUTH DAKOTA BOARD OF REGENTS, Pierre, SD (US)

( * ) Notice: Subject to any disclaimer, the term of this patent is extended or adjusted under 35 U.S.C. 154(b) by 112 days.

(21) Appl. No.: 16/329,653

(22) PCT Filed: Aug. 31, 2016

(86) PCT No.: PCT/US2016/049727
§ 371 (c)(1),
(2) Date: Feb. 28, 2019

(87) PCT Pub. No.: WO2018/044298
PCT Pub. Date: Mar. 8, 2018

(65) Prior Publication Data
US 2019/0193033 A1    Jun. 27, 2019

(51) Int. Cl.
*B01D 69/12* (2006.01)
*B01D 69/10* (2006.01)
(Continued)

(52) U.S. Cl.
CPC ....... *B01D 69/125* (2013.01); *B01D 67/0079* (2013.01); *B01D 69/10* (2013.01);
(Continued)

(58) Field of Classification Search
None
See application file for complete search history.

(56) References Cited

U.S. PATENT DOCUMENTS

| 4,277,344 A | 7/1981 | Cadotte |
| 5,238,878 A | 8/1993 | Shinohara |
| (Continued) | | |

FOREIGN PATENT DOCUMENTS

| CN | 100457241 C | 2/2009 |
| CN | 101185849 B | 1/2011 |
| (Continued) | | |

OTHER PUBLICATIONS

Guo-Rong Xu, Sheng-Hui Wang, He-Li Zhao, Shui-Bo Wu, Jian-Mei Xu, Lu Li, Xiao-Yu Liu, Layer-by-layer (LBL) assembly technology as promising strategy for tailoring pressure-driven desalination membranes, Journal of Membrane Science, vol. 493, 2015, pp. 428-443 (Year: 2015).*

(Continued)

*Primary Examiner* — Jason M Greene
*Assistant Examiner* — Eric J McCullough
(74) *Attorney, Agent, or Firm* — McKee, Voorhees & Sease, PLC

(57) ABSTRACT

This invention relates thin film nanocomposites (TFNCs) and methods of preparing the same by molecular layer-by-layer assembly. The TFNCs comprise a porous nanofibrous support first layer coated with a mid-layer having an outer separating layer, wherein the out separating layer has one or more bilayers or trilayers. The TFNCs can be particularly suitable for use as filtration membranes for the separation of dissolved components from fluids such as ultrafiltration, nanofiltration, and reverse osmosis. Thus, embodiments of the invention also include filtration systems and methods of filtering.

16 Claims, 12 Drawing Sheets

(51) Int. Cl.
  *B01D 71/56* (2006.01)
  *B01D 69/14* (2006.01)
  *B01D 67/00* (2006.01)

(52) U.S. Cl.
  CPC ........... *B01D 69/12* (2013.01); *B01D 69/148* (2013.01); *B01D 71/56* (2013.01); *B01D 2323/26* (2013.01); *B01D 2323/30* (2013.01); *B01D 2323/39* (2013.01); *B01D 2323/40* (2013.01); *B01D 2325/02* (2013.01)

(56) References Cited

U.S. PATENT DOCUMENTS

| | | | |
|---|---|---|---|
| 2008/0149561 A1* | 6/2008 | Chu | B01D 69/10 210/500.38 |
| 2010/0213125 A1 | 8/2010 | Fontalvo Alzate et al. | |
| 2014/0083925 A1* | 3/2014 | Stafford | B01D 69/122 210/489 |
| 2014/0120144 A1 | 5/2014 | Abe et al. | |
| 2014/0275347 A1 | 9/2014 | Nawani et al. | |
| 2014/0319706 A1* | 10/2014 | Huizing | B29D 99/005 261/102 |
| 2015/0141711 A1 | 5/2015 | Chu et al. | |
| 2016/0051939 A1 | 2/2016 | Choi et al. | |
| 2016/0121533 A1 | 5/2016 | Zhang et al. | |

FOREIGN PATENT DOCUMENTS

| | | |
|---|---|---|
| CN | 102089068 A | 6/2011 |
| CN | 102698614 A | 10/2012 |
| CN | 102921314 A | 2/2013 |
| CN | 103182252 A | 7/2013 |
| CN | 104010717 A | 8/2014 |
| CN | 104906963 A | 9/2015 |
| EP | 2276558 B1 | 1/2011 |
| WO | 2008103599 A2 | 8/2008 |
| WO | 2008110538 A2 | 9/2008 |
| WO | 2008118228 A2 | 10/2008 |
| WO | 2011142726 A1 | 11/2011 |
| WO | 2012047359 A1 | 4/2012 |
| WO | 2014120095 A1 | 8/2014 |
| WO | 2014158660 A1 | 10/2014 |
| WO | 2015079442 A1 | 6/2015 |

OTHER PUBLICATIONS

Characteristics of Model Polyelectrolyte Multilayer Films Containing Laponite Clay Nanoparticles, M. Elzbieciak, D. Wodka, S. Zapotoczny, P. Nowak, and P. Warszynski, Langmuir 2010 26 (1), 277-283 (Year: 2010).*
Hang Dong, Liguang Wu, Lin Zhang, Huanlin Chen, Congjie Gao, Clay nanosheets as charged filler materials for high-performance and fouling-resistant thin film nanocomposite membranes, Journal of Membrane Science, vol. 494, 2015, pp. 92-103 (Year: 2015).*
Patro TU, Wagner HD. Layer-by-layer assembled PVA/Laponite multilayer free-standing films and their mechanical and thermal properties. Nanotechnology. Nov. 11, 2011; 22(45):455706. (Year: 2011).*
Chun-Hui Zhou, Preparation and functionality of clay-containing films, J. Mater. Chem., 2011,21, 15132-15153 (Year: 2011).*
South Dakota Board of Regents, PCT/US2016/049727 filed Aug. 3, 2016, "The International Search Report and the Written Opinion of the International Searching Authority, or the Declaration", 17 pages, dated Nov. 18, 2016.
Mo, Zhirui, Interfacial Polymerization on Cellulose Nanofiber-Based Membrane as a New Pathway for Fabrication of Thin Film Nanocomposite Membrane, A Thesis in Partial Fulfillment of the Requirements for the Degree of Master of Science in Chemistry, Stony Brook University, 60 pages, Aug. 2012.
Al-Hobaib et al., "Synthesis and characterization of reverse osmosis membranes modified with BaTiO3 nanoparticles to improve performance", Water Resources Management, vol. 196, pp. 257-266, 2015.
Ingole et al., "Synthesis, characterization and surface modification of PES hollow fiber membrane support with polydopamine and thin film composite for energy generation", Chemical Engineering Journal, vol. 243, pp. 137-146, Jan. 11, 2014.

* cited by examiner

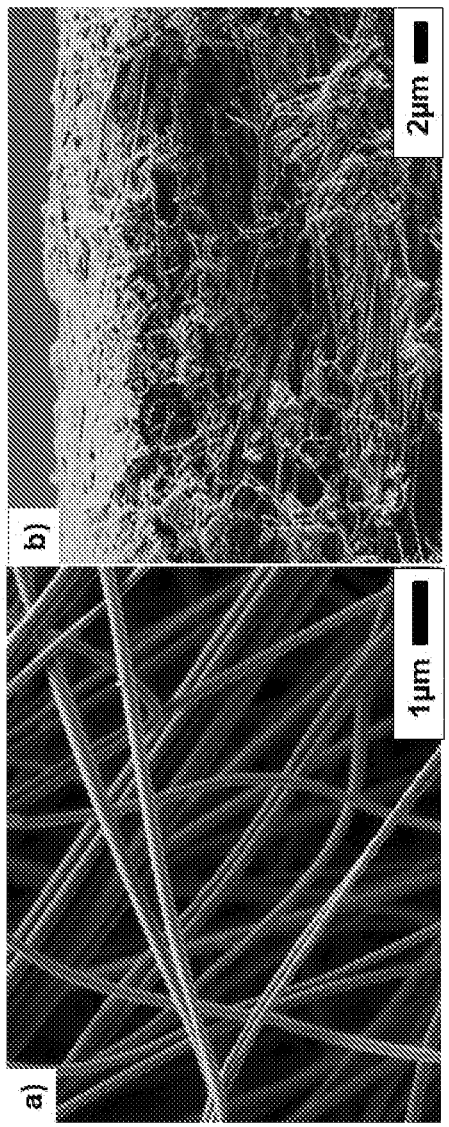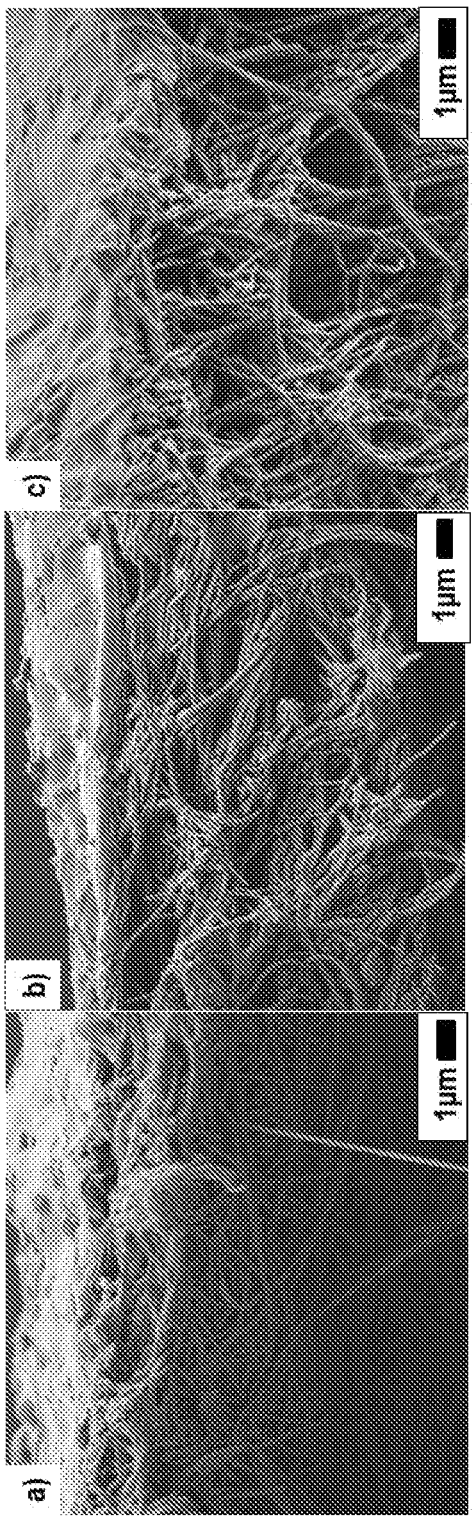
FIG. 6
FIG. 7

MULTILAYER THIN FILM NANOCOMPOSITE MEMBRANES PREPARED BY MOLECULAR LAYER-BY-LAYER ASSEMBLY

GOVERNMENT SPONSORED RESEARCH

This invention was made with government support under Contract Number FA4819-14-C-0004 awarded by the US Air Force Civil Engineering Center. The government has certain rights in the invention.

CROSS-REFERENCE

This is a National Phase Application under 35 U.S.C. § 371 claiming priority to PCT/US16/49727, filed Aug. 31, 2016, which is incorporated by reference in its entirety.

FIELD OF THE INVENTION

This invention relates thin film nanocomposites (TFNCs) and methods of preparing the same by molecular layer-by-layer assembly. The TFNCs can be particularly suitable for use as filtration membranes for the separation of dissolved components from fluids such as ultrafiltration, nanofiltration, and reverse osmosis. Embodiments of the invention also include filtration systems and methods of filtering.

BACKGROUND OF THE INVENTION

Membrane technology is the most energy efficient technology used for water purification, virus filtration, protein separation, waste water reclamation and seawater desalination. The central part of the membrane process is a semipermeable membrane with desired porosity and the separation is usually induced by external applied pressure. Under the effect of applied pressure, solvents pass through the semipermeable membranes and solute particles larger than the pore size of the membranes are retained.

Current state-of-the-art membranes used for liquid separation are thin film composite (TFC) membranes. In a typical pressure driven membrane separation process such as ultrafiltration (UF), nanofiltration (NF) and reverse osmosis (RO), the nature of the barrier/separating layer determines the separation efficiency of the membranes. The support layer structure in the TFC membranes normally act as a mechanical support to the selective layer/barrier layer under the stress of applied pressure, and it does not have any prominent role in determining the separation efficiency.

TFC membranes currently used for the seawater desalination are prepared by interfacial polymerization. Despite its excellent separation capability and wide pH tolerance, TFC membranes have relatively low permeability due to the considerable resistance offered by the asymmetric polymeric support. More specifically, considering the resistance offered by the asymmetric support operating pressure in the range of 1.5 MPa is essential to provide viable filtration rate. This results in increase in energy cost and mechanical breakage of the membrane during operation. Conventional TFC membranes also have shown structural degradation upon exposure to aqueous chlorine.

As a step to improve the separation efficiency, fouling resistance and chlorine stability of TFC membranes, researchers have been involved in the modification of polyamide (PA) selective layer structure since its invention by J. E Cadotte (Synthetic Membranes: 1974, Chapter 21, 305-326). In the scientific literature, a number of journal articles and patents on TFC membranes preparation/modification were reported. In these articles and patents, the PA selective layer of the TFC membranes was formed by interfacial polymerization (IP) of an amine and acid chloride on an asymmetric support. Since these TFC structures are developed based on asymmetric support, high applied pressure (~1.5 MPa) was essential to induce permeation through these membranes. Also, due to the rapid reaction between these monomers, the system reaches a gel point very quickly, and as a result the PA selective layers formed are highly heterogeneous, with a ridge-valley topography and little control over layer thickness and structure, resulting in the potential for high fouling and inconsistent performance.

Some membranes have also been prepared by molecular layer-by-layer assembly. However, the molecular layer-by-layer modified TFC membranes reported so far have been prepared on an asymmetric support, requiring high pressure, and are susceptible to chlorine attack. Further, the selective layer formation growth rate (0.9 nm/cycle for a 10 s deposition time) has not useful for the large scale preparation. Thus these deficiencies have made such membranes impractical for commercial production and use.

Accordingly, it is an objective of the claimed invention to develop methods of preparing thin film nanocomposites and/or membranes having smoother and more uniform distribution in the selective polyamide layer.

A further object of the invention is to provide improved thin film nanocomposites and/or filtration membranes.

A further object of the invention is to provide filtration apparatuses and/or methods of filtering.

Other objects, advantages and features of the present invention will become apparent from the following specification taken in conjunction with the accompanying drawings.

BRIEF SUMMARY OF THE INVENTION

The present invention provides for the synthesis of polymer nanocomposite membrane structures based on porous nanofiber mats by employing molecular layer-by-layer assembly. The inventors have discovered that incorporation of nanomaterials as building blocks in the preparation results in the rapid, steady and controlled growth of the selective layer. An advantage of the invention is that by use of the molecular layer-by-layer process the resulting selective layer growth, chemical composition, thickness, nanomaterials dispersion and inter planar spacing between the polyamide layers can be controlled and tailored. An additional advantage of the present invention is that the method can be extended to incorporate various nanostructures (e.g., nanoclays, graphene oxide, reduced graphene, carbon nanotubes, zeolites, metal oxide nanoparticles, polymers, polyelectrolytes, ions, specific ionic groups etc.) in between polyamide layers.

In an embodiment, the present invention provides a composition and/or a method for preparing a composition comprising obtaining a support layer, wherein the support layer is a porous nanofibrous mat, matrix, scaffold, weave, or combination thereof; coating a polymer and/or oligomer on the porous nanofibrous support layer to form a mid-layer on the support layer; forming an outer layer on the mid-layer, wherein the outer layer comprises one or more polyamide bilayers, wherein the polyamide bilayer is formed by exposing an acid chloride and diamine to the mid-layer.

A further embodiment of the invention provides a filtration apparatus and/or system including one or more of the thin film nanocomposite membranes prepared by obtaining a support layer, wherein the support layer is a porous nanofibrous mat, matrix, scaffold, weave, or combination thereof; coating a polymer and/or oligomer on the porous nanofibrous support layer to form a mid-layer on the support layer; forming an outer layer on the mid-layer, wherein the outer layer comprises one or more polyamide bilayers, wherein the polyamide bilayer is formed by exposing an acid chloride and diamine to the mid-layer.

Still another embodiment of the invention is a method of filtering a gas or liquid comprising passing a gas or liquid through one or more of the thin film nanocomposite membranes prepared by obtaining a support layer, wherein the support layer is a porous nanofibrous mat, matrix, scaffold, weave, or combination thereof; coating a polymer and/or oligomer on the porous nanofibrous support layer to form a mid-layer on the support layer; forming an outer layer on the mid-layer, wherein the outer layer comprises one or more polyamide bilayers, wherein the polyamide bilayer is formed by exposing an acid chloride and diamine to the mid-layer.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

BRIEF DESCRIPTION OF THE FIGURES

FIG. 6(a) is a scanning electron microscope image showing the typical morphology of an electrospun nanofibrous mat used as support layer of the present invention.

FIG. 6(b) shows the scanning electron microscope image of the electrospun nanofibrous mat of FIG. 6a after the formation of mid-layer by spin coating.

FIGS. 7(a)-7(c) are scanning electron microscope images showing the morphologies of TFNC nanofibrous membranes with 7(a) showing eight bilayers, 7(b) showing twelve bilayers, and 7(c) showing fourteen bilayers.

FIG. 8(b) shows the transmission electron microscopic image of the cross sections of the TFNC membrane prepared by mLbL with six trilayers.

Figure 1A:
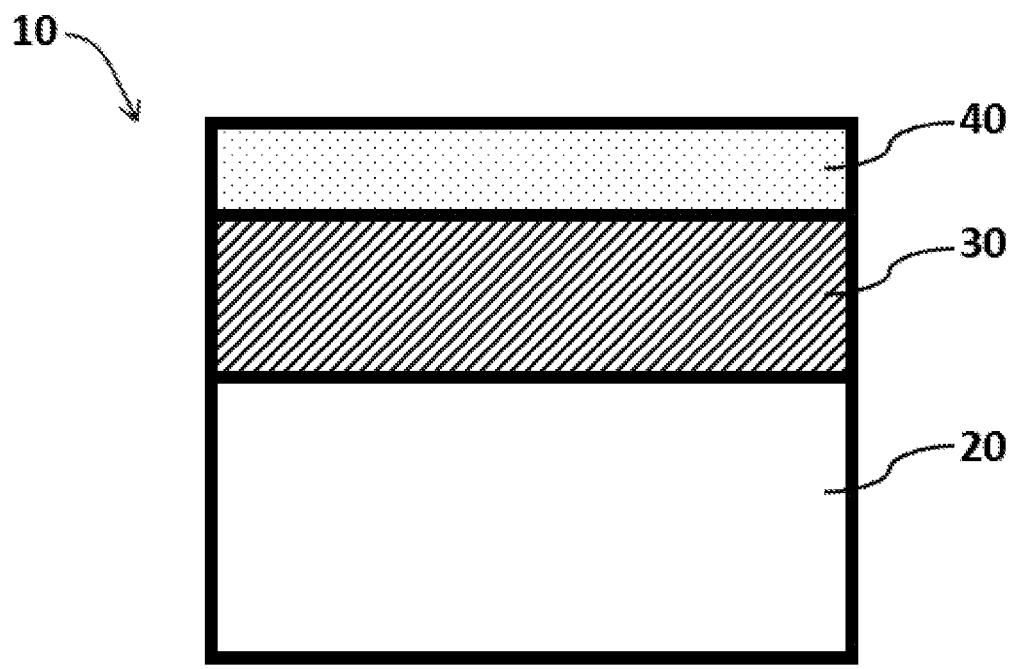
FIGS. 1(a)-1(b) provide exemplary drawings of the layers of a composition of the invention, not depicted to indicate shape, scale, or ratio of component sizes with respect to each other.
Figure 1B:
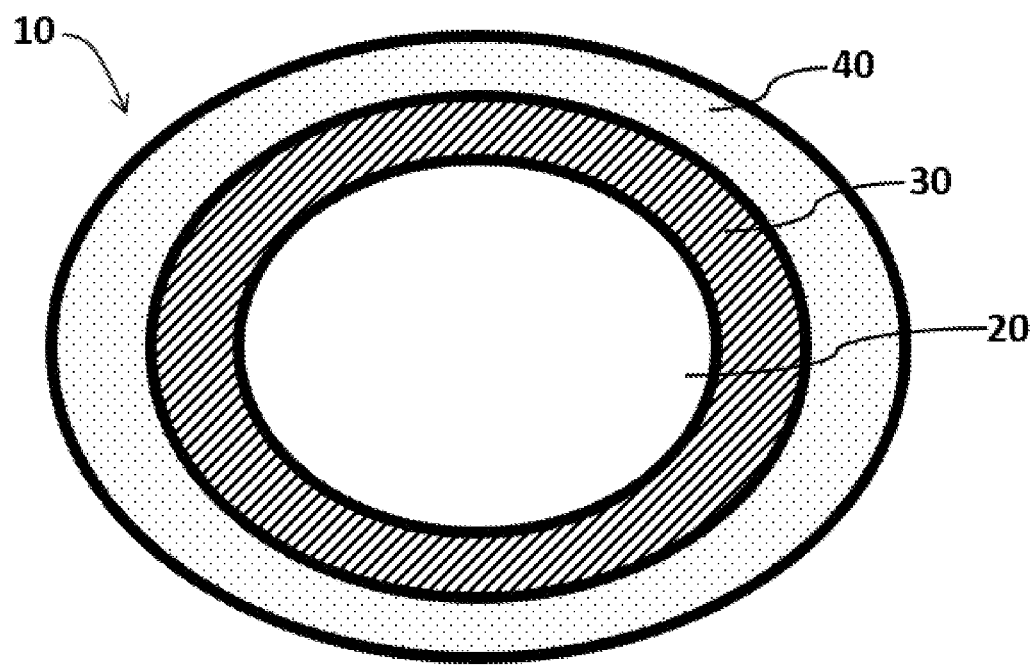

Various embodiments of the present invention will be described in detail with reference to the figures, wherein like reference numerals represent like parts throughout the several views. Reference to various embodiments does not limit the scope of the invention. Figures represented herein are not limitations to the various embodiments according to the invention and are presented for exemplary illustration of the invention.

DETAILED DESCRIPTION OF THE PREFERRED EMBODIMENT

The present invention relates to thin film nanocomposites and methods of making them by molecular layer-by-layer assembly (mLbL). Preparation of a multi-tier structure comprising of the following steps (a) preparation of a porous nanofiber support by electrospinning; (b) preparation of a mid-layer by spin coating the above nanofibers with a suitable polymer and (c) selective layer formation by depositing the amines, acid chlorides and nanoparticle clay components in a precise manner. The methods of preparing thin film nanocomposites of the invention have many advantages over existing methods. For example, the methods of the invention allow for precise and selective preparation of an outer layer, whereas existing methods do not permit such deposition. Additionally, the thin film nanocomposites of the invention have many advantages over existing thin film nanocomposites. For example, membranes made from the TFNCs of the invention have improved physical and chemical properties benefiting their use as filtration membranes.

Definitions

So that the present invention may be more readily understood, certain terms are first defined. Unless defined otherwise, all technical and scientific terms used herein have the same meaning as commonly understood by one of ordinary skill in the art to which embodiments of the invention pertain. Many methods and materials similar, modified, or equivalent to those described herein can be used in the practice of the embodiments of the present invention without undue experimentation, the preferred materials and methods are described herein. In describing and claiming the embodiments of the present invention, the following terminology will be used in accordance with the definitions set out below.

Numeric ranges recited within the specification are inclusive of the numbers defining the range and include each integer within the defined range. Throughout this disclosure, various aspects of this invention are presented in a range format. It should be understood that the description in range format is merely for convenience and brevity and should not be construed as an inflexible limitation on the scope of the invention. Accordingly, the description of a range should be considered to have specifically disclosed all the possible sub-ranges, fractions, and individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6, and decimals and fractions, for example, 1.2, 3.8, 1½, and 4¾. This applies regardless of the breadth of the range.

The embodiments of this invention are not limited to particular filtration processes, which can vary and are understood by skilled artisans. It is further to be understood that all terminology used herein is for the purpose of describing particular embodiments only, and is not intended to be limiting in any manner or scope. For example, as used in this specification and the appended claims, the singular forms "a," "an" and "the" can include plural referents unless the content clearly indicates otherwise. Further, all units, prefixes, and symbols may be denoted in its SI accepted form.

The term "about," as used herein, refers to variation in the numerical quantity that can occur, for example, through typical measuring and liquid handling procedures used for making concentrates or use solutions in the real world; through inadvertent error in these procedures; through differences in the manufacture, measurement quantifications (e.g., weight, volume, temperature, and time), source, or purity of the ingredients used to make the compositions or carry out the methods; and the like. The term "about" also encompasses amounts that differ due to different equilibrium conditions for a composition resulting from a particular initial mixture. Whether or not modified by the term "about", the claims include equivalents to the quantities.

As used herein, the term "analog" means a molecular derivative of a molecule. The term is synonymous with the terms "structural analog" or "chemical analog."

As used herein, the term "oligomer" refers to a molecular complex comprised of between one and ten monomeric units. For example, dimers, trimers, and tetramers, are considered oligomers. Furthermore, unless otherwise specifically limited, the term "oligomer" shall include all possible isomeric configurations of the molecule, including, but are not limited to isotactic, syndiotactic and random symmetries, and combinations thereof. Furthermore, unless otherwise specifically limited, the term "oligomer" shall include all possible geometrical configurations of the molecule.

As used herein the term "polymer" refers to a molecular complex comprised of a more than ten monomeric units and generally includes, but is not limited to, homopolymers, copolymers, such as for example, block, graft, random and alternating copolymers, terpolymers, and higher "x"mers, further including their analogs, derivatives, combinations, and blends thereof. Furthermore, unless otherwise specifically limited, the term "polymer" shall include all possible isomeric configurations of the molecule, including, but are not limited to isotactic, syndiotactic and random symmetries, and combinations thereof. Furthermore, unless otherwise specifically limited, the term "polymer" shall include all possible geometrical configurations of the molecule.

The term "microscale" and the related prefix "micro-" as used herein is intended to refer to items that have at least one dimension that is one or more micrometers and less than one millimeter.

The term "micro-channel" refers to channels having at least part of the channel diameter at least one micrometer and less than one millimeter.

The term "nano-channel" refers to channels having at least part of the channel diameter less than one micrometer.

The term "nanoscale" and the related prefix "nano-" as used herein is intended to refer to measurements that are less than one micrometer.

The term "nanoparticle" includes, for example, "nanospheres," "nanorods," "nanocups," "nanowires," "nanoclusters," "nanofibers," "nanolayers," "nanotubes," "nanocrystals," "nanobeads," "nanobelts," and "nanodisks."

As used herein, the term "nanotube" refers to cylindrical structures formed by nanoparticles. In a preferred embodiment, nanotubes are formed by carbon-based nanoparticles. In one embodiment, the nanotubes are single-walled nanotubes ("SWNT"), double-walled nanotubes ("DWNT"), multi-walled nanotubes ("MWNT"), or a combination of the same. In a preferred embodiment, the nanotubes include SWNT, MWNT, and/or DWNT. As used herein, the term MWNT is inclusive of DWNTs. When the nanotube is carbon-based the abbreviation is modified by a "C-," for example, C-SWNT and C-MWNT.

The term "weight percent," "wt. %," "wt-%," "percent by weight," "% by weight," and variations thereof, as used herein, refer to the concentration of a substance as the weight of that substance divided by the total weight of the composition and multiplied by 100.

The terms "water miscible" as used herein, means that the material is soluble or dispersible in water in the inventive compositions. In general, the polymer should be soluble or dispersible at 25° C. at a concentration of 0.0001% by weight of the water solution and/or water carrier, preferably at 0.001%, more preferably at 0.01% and most preferably at 0.1%.

The methods, systems, apparatuses, and compositions of the present invention may comprise, consist essentially of, or consist of the components and ingredients of the present invention as well as other ingredients described herein. As used herein, "consisting essentially of" means that the methods, systems, apparatuses and compositions may include additional steps, components or ingredients, but only if the additional steps, components or ingredients do not materially alter the basic and novel characteristics of the claimed methods, systems, apparatuses, and compositions.

It should also be noted that, as used in this specification and the appended claims, the term "configured" describes a system, apparatus, or other structure that is constructed or configured to perform a particular task or adopt a particular configuration. The term "configured" can be used interchangeably with other similar phrases such as arranged and configured, constructed and arranged, adapted and configured, adapted, constructed, manufactured and arranged, and the like.

Compositions

The compositions of the invention can be thin film nanocomposites and membranes. As shown in FIG. 1(a), FIG. 1(b), FIG. 4, and FIG. 5, the thin film nanocomposites 10 of the invention includes a porous nanofiber support layer 20; a mid-layer 30 comprised of a polymer coated on the first layer; and an outer layer 40 selectively deposited on the mid-layer. The outer layer 40 can be a bilayer or a trilayer and/or multiple bilayers and/or trilayers stacked to a desired thickness. In an aspect of the invention, multiple bilayers and/or trilayers can be deposited over each other until a desired thickness is achieved for the outer layer. The thin film nanocomposites can used to form a membrane. Such membranes are particularly suitable as filtration membranes. Filtration membranes prepared with the thin film nanocomposites include, but are not limited to, ion filtration membrane, ultrafiltration membranes, nanofiltration membranes, reverse osmosis membranes, and biological filtration membranes (e.g., virus filtration membranes, protein separation membranes, etc.).

The first layer is a porous layer. In an aspect of the invention, the first layer can act as a support layer. The porosity of the support layer can be selected to provide particular properties whether those properties be a minimum support strength or filtration function such as speed, pore size, etc. In an aspect of the invention, the porous layer can have hierarchical porosity. In certain embodiments of the invention, the porous support layer can have a porosity of at least about 70%, preferably at least about 80%, more preferably at least about 90%, and most preferably at least about 95%. The porous support layer can be a nanofibrous mat, woven support, nonwoven support, matrix, scaffold, weave, or combination thereof.

The first layer comprises one or more polymers and/or oligomers. Suitable polymers and oligomers, include, but are not limited to, cellulose acetate, cellulose, chitosan, chitin, cellulose acetate butyrate, cellulose acetate propionate, polyacrylonitrile, polyvinylalcohol, polysulphone, polyphenylsulfone, polyethersulfone, polystyrene, polyurethane, polyimide, polyetherimide, polyamideimide, polyvinylidene fluoride, polymethylmethacrylate, sulfonated, carboxylated, aminated & epoxidated form of these polymers, poly(styrene)-block-poly(acrylic acid), poly (styrene-block-methyl methacrylate), polyethylene-block-poly(ethylene glycol), poly (vinyl alcohol-co-ethylene) and combinations or mixtures thereof. Preferred polymers include cellulose acetate, cellulose, chitosan, chitin cellulose acetate butyrate, cellulose acetate propionate, polyacrylonitrile, polyvinylalcohol, polysulphone, polyphenylsulfone, polyethersulfone, polystyrene, polyurethane, polyimide, polyetherimide, polyamideimide, polyvinylidene fluoride, polymethylmethacrylate, functionalized form of these polymers and combinations or mixtures thereof. In a preferred embodiment of the invention, the polymers and/or oligomers are capable of being electrospun to form the porous support structure.

The mid-layer comprises a polymer and/or oligomer and optionally a crosslinking agent. The mid-layer can have —OH or —COOH reactive groups on its surface. The mid-layer can have a thickness of between about 100 nm and about 500 nm, preferably between about 150 nm and about 400 nm, more preferably between about 200 nm and about 300 nm. Suitable polymers for the mid-layer include, but are not limited to, polyvinylalcohol, chitosan, chitin, polyvinylpyrrolidone, polyethyleneoxide, polyethyleneglycol, cellulose acetate, cellulose acetate butyrate, cellulose triacetate, and combinations or mixtures thereof. Suitable crosslinking agents can be chosen based on the polymer and/or oligomer employed. Preferred crosslinking agents include, but are not limited to, polyethyleneglycol diglycidyl ether (PEGDGE), glutaraldehyde, succinic acid, epichlorohydrin, and mixtures thereof. The mid-layer is coated on the first layer, which can be done by spin-coating, blade coating (cast coating), spray coating, slot-die coating, slide coating, dip coating, a combination thereof, or a similar methods. In an aspect of the invention, the polymer and/or oligomer for the mid-layer can be selected based on the coating technique. In a preferred embodiment of the invention, the mid-layer is spin coated.

In an aspect of the invention, the ratio of crosslinking agent to polymer and/or oligomer is any composition in between 0.10 to 0.40 and the associated relative concentrations in the solvent.

The outer layer is selectively deposited and can comprise one or more bilayers or trilayers. The trilayer comprises a polyamide forming a bilayer. Embodiments of the invention can include an additional component forming a trilayer. Suitable additional components, include, but are not limited to, nanoclay, graphene oxide, reduced graphene, fullerenes, element nanoparticles, metal nanoparticles, metalloid nanoparticles, metal oxide nanoparticles, metalloid oxide nanoparticles, polymers, polyelectrolytes, zeolites, carbon nanotubes, ions and ionic groups in the cationic or anionic forms. In a preferred embodiment the additional component comprises a clay. In an aspect of the invention, the clay is in the form of nanoparticles and may be selectively deposited on the polyamide forming the trilayer.

The bilayer structure in the disclosed thin film nanocomposites can be a smooth, highly crosslinked network, such as an aliphatic or aromatic polyamide, polypiperazine isophtalamide, a polyester-urea, a polyester, or a polyimide or a copolymer thereof or a mixture of any of them. The bilayer can comprise residues of acid chloride and a diamine. Further, the bilayer can be an aliphatic or aromatic polyamide prepared by the reaction of a diamine and an acid chloride. Any diamines can be used to form the bilayer. A preferred diamine, includes, but is not limited to, phenylene diamine including substitution in the meta, ortho, and para positions. In another embodiment the bilayer formed may be from amine residues of piperazine, jeffamine D-230, polyetherimine, diaminobenzene, triaminobenzene, polyethylenimine, amine functionalized polyhedral oligomeric silsesquioxane and combinations thereof. The acid chloride used may be from isophthaloyl chloride, terephthaloyl chloride, a trimesoyl chloride, or a mixture thereof.

Suitable clays include, but are not limited to, attapulgite, bentonite, cloisite, illites, laponite, kaolinite, montmorillonite, nontronite, saponite, hectorite, and halloysite.

Suitable polyelectrolytes include, but are not limited to, polyacrylic acid, polystyrene sulfonate, polyallylaimine, polyallylaimine hydrochloride, polyvinyl sulfonic acid, poly (diallyl dimethyl ammonium chloride), poly (4-vinylbenzyltrimethyl ammonium chloride) or a mixture thereof.

Suitable element nanoparticles can include, but are not limited to, nanoparticles of Si, Ti, V, Cr, Mn, Fe, Co, Ni, Cu, Y, Zr, Mo, Ta, Au, Ag, Th, La, Ce, Pr, Nb, Gd, Tb, Dy, Ho, Er, Tm, Yb, Lu, Mo, Pd, Sn, W, and their alloys, their oxides, and combinations thereof. Preferred metal oxides include, but are not limited to, $Al_2O_3$, $CuO$, $MgO$, $V_2O_5$, $BiO_2$, $Sb_2O_5$, $TiO_2$, $ZnO$, $Fe_2O_3$, $Fe_3O_4$, $CrO_3$, $NiO$, $Ni_2O_3$, $CoO$, $Co_2O_3$, and $Co_3O_4$. Furthermore, unless specified, the chemical formula of a nanoparticle represents any of the possible crystalline forms and/or, where applicable, an amorphous form. For example, the chemical formula $Al_2O_3$ can represent alpha-, beta-, or gamma-aluminum oxide, or combinations thereof. Preferred metalloid oxides include but are not limited to $SiO_2$, $TiO_2$, $GeO_2$, $B_2O_3$, and $TeO_2$ and/or, where applicable, amorphous forms. Furthermore, unless specified, the chemical formula of a nanoparticle represents any of the possible crystalline forms. For example, the chemical formula $B_2O_3$ can represent alpha- or beta-boron oxide, or combinations thereof.

Suitable ionic groups include, but are not limited to, amine, branched amines, ammonium, acetate, azide, bicarbonate, bisulfate, bisulfite, carbonate, carboxylate, chlorate, chlorite, chromate, cyanate, dichromate, epoxides, halides, hydroxide, hypochlorite, ionic polymers, nitrate, nitrite, oxalate, perchlorate, peroxide, phosphate, phosphite, sulfate, sulfite, sulfonate, thiocyanate, thiosulfate, and combinations thereof.

Additional suitable nanomaterials include, but are not limited to, carbon nanotubes, graphene oxide, alumina silicates, reduced graphene, single walled carbon nanotubes, multi-walled carbon nanotubes, fullerenes, zeolites, or a mixture thereof.

Bilayers and trilayers can be layered on themselves or on each other. Theoretically, while there is no necessary limit as to the number of bilayers and/or trilayers that can be layered, it is believed that no more than 50 would be desired. Thus, preferably there are between 1 and 50 bilayers and/or trilayers forming the third layer of the composition. The selective layer formed by bilayer and/or trilayer deposition can have a thickness of between about 200 nm and about 4000 nm (i.e., about 4 μm).

In an embodiment of the invention, the third layer can comprise an amine, acid chloride, and a clay component selectively deposited. In another embodiment of the invention, the compositions of the invention can be a thin film nanocomposite membrane comprised of three layers: a top selective tri-layer made of amines, acid chlorides and additional particles (such as clay particles, graphene, fullerenes, zeolites), a mid-layer comprised of polymers and/or oligomers deposited by spin coating, and a porous support layer comprised of a polymer and/or oligomer nanofiber mat made by electrospinning.

In yet another embodiment, the present invention provides a thin film nanocomposites membrane comprised of three layers: a top selective bi-layer structure made of amines and acid chlorides as building blocks, a mid-layer comprised of polymers and/or oligomers deposited by spin coating, and a porous support layer comprised of a polymer and/or oligomer nanofiber mat made by electrospinning.

In an aspect of the invention, the TFNCs and/or TFNC membranes may be shaped as desired. Thus, the TFNCs and/or TFNC membranes can be conformed to a desired shape suitable for a particular filtration apparatus and/or method.

Methods of Preparing the Compositions

The compositions of the invention can be prepared by molecular layer-by-layer assembly (mLbL assembly). Contrary to interfacial polymerization, the mLbL assembly does not require an interface between the aqueous and organic solvents and thus can be used to integrate any type novel structures into the selective layer of the resultant membranes. Also, mLbL is not restricted to any specific type of solvents and thus can be extended to integrate desired nanomaterials in its most dispersed form to improve the performance. In an aspect of the invention, it has been found that by using the mLbL assembly, the selective layer can be applied in a more uniform and smooth manner than has been achieved by interfacial polymerization. Molecular layer by-layer (mLbL) deposition involves the sequential reaction of a diamine and an acid chloride to form chemically robust and highly crosslinked networks that do not suffer the kinetic and mass transfer limitations of traditional interfacial polymerization. As a result, the thickness and chemical composition of the polyamide layer can be controlled at the nanometer scale. Precisely, the thickness of the separating layer can be controlled by the number of deposition cycles, while its chemical composition can be manipulated by using monomers of our interest. Such growth and thickness control has not been possible with the use of interfacial polymerization.

The first layer, a porous support structure can be prepared by electrospinning or obtained from other sources not based on electrospinning typically used in the art. If prepared by electrospinning the polymer and/or oligomer is dissolved in a solvent to form an electrospinning dope solution. A solvent can be selected based on its ability to dissolve the chosen polymer and/or oligomer. Suitable solvents include, but are not limited to, polar protic and/or polar aprotic solvents. Preferred polar solvents include, but are not limited to, tetrahydrofuran, ethyl acetate, dimethyl formamide, N-methylpyrrolidone, dimethylacetamide, and dimtheylsulfoxide.

In an embodiment of the invention, the electrospinning dope solution can comprise between about 1 wt. % and about 30 wt. % polymer and/or oligomer, preferably between about 5 wt. % and about 25 wt. % polymer and/or oligomer, more preferably between about 7 wt. % and about 15 wt. % polymer and/or oligomer. The electrospinning dope solution can then be used to prepare a porous support structure by electrospinning the dope solution to form nanofibers collected to form a mat. Electrospun nanofibers can also be woven to form a weave, or overlaid to form a matrix. Preferably the diameters of the nanofibers are between about 10 nm and about 2500 nm, more preferably between about 20 nm, and about 2000 nm, most preferably between about 50 nm and about 1000 nm (i.e., about 1 μm). In an aspect of the invention, the electrospun nanofiber support can permit the TFNC membranes to be operated at low applied pressure for the desired permeability.

The second layer, a mid-layer, can be prepared by spin coating a polymer and/or oligomer on the porous structure layer. Other options for preparation of the mid-layer include blade coating (cast coating), spray coating, slot-die coating, slide coating, dip coating and similar methods. In one aspect of the invention, the mid-layer is functionalized with reactive —OH or —COOH groups. In an embodiment of the invention, the polymer and/or oligomer is dissolved to form a spin-coating dope solution. In an embodiment of the invention, the spin-coating dope solution can comprise between about 0.5 wt. % and about 20 wt. % polymer and/or oligomer, preferably between about 0.7 wt. % and about 15 wt. %, more preferably between about 1 wt. % and about 10 wt. %. The polymer and/or oligomer can be dissolved in a suitable solvent. For example, water soluble polymers can be dissolved in water or another water miscible solvent. Preferred solvents include, but are not limited to, water, tetrahydrofuran, 1,4-dioxane, acetic acid, formic acid and combinations thereof. To assist with the dissolution of the polymer and/or oligomer, the polymer can be stirred and/or heated in the liquid. In an aspect of the invention, the crosslinking agent can be in a ratio to the solvent of between about 2:1 to about 20:1, preferably 3:1 to about 19:1.

The spin coating can be performed at any suitable rotation speed, including a rotating speed that varies. Preferably the rotation speed is between about 200 rpm and 3000 rpm, more preferably between about 350 rpm and about 2500 rpm, most preferably between about 500 rpm and about 2000 rpm. The spin coating time is performed for a time sufficient to provide a desired thickness and may be influenced by the rotation speed. Preferably the time will be from about 10 seconds to about 300 seconds, more preferably from about 15 seconds to about 180 seconds, most preferably from about 20 seconds to about 150 seconds.

The mid-layer can be crosslinked. A crosslinking agent can be selected as is appropriate for the polymer and/or oligomer. Further the method of crosslinking can be chosen as is appropriate for the polymer and/oligomer and the crosslinking agent. For example, the crosslinking may be performed by crosslinking occurs by in situ polymerization, heat treatment, pressurization, pH modification, or radiation exposure. As such, the crosslinking step may include heating, pressurizing, adding a pH adjuster, or radiating the composition to induce the crosslinking.

The third layer can be formed on the mid-layer by molecular layer-by-layer assembly to form one or more bilayers and/or trilayers. Formation of a bilayer occurs by reacting an acid chloride with a diamine to form a polyamide. This can take place in two steps. If the mid-layer has reactive —OH groups, the first step is exposing the second layer to an acid chloride solution. Second, exposing the resultant composition to a diamine solution. If the mid-layer has reactive —COOH groups, then the first step is exposing the second layer to a diamine solution. Second, exposing the resultant composition to an acid chloride solution.

To form a bilayer, the second layer can be exposed (by soaking or some other suitable method) to an acid chloride solution for a time sufficient to react with the —OH groups on the second layer or with the diamine. Preferably, the time is between about 10 seconds to about 300 seconds, preferably from about 15 seconds to about 240 seconds, more preferably from about 20 seconds to about 150 seconds. The acid chloride solution can be prepared with any suitable solvent. Preferred solvents are nonpolar, organic solvents. Preferred organic solvents include, but are not limited to, acetone, chloroform, cyclohexane, cyclopentane, dichloromethane, diethyl ether, hexane, pentane, and toluene. Preferably the solvent has a high volatility so that the layers can dry quickly after the deposition. In an embodiment of the invention, the concentration of the acid chloride in solution can between about 0.1 wt. % and about 10 wt. %, preferably about 0.5 wt. % and about 5 wt. %, more preferably about 0.1 wt. % and about 2 wt. % of the solution.

The composition is exposed to a diamine solution for a time sufficient to react the —COOH groups or acid chloride. Preferably the time is from about 10 seconds to about 300 seconds, preferably from about 15 seconds to about 240 seconds, more preferably from about 20 seconds to about 150 seconds. The diamine solution can be prepared with any suitable solvent. Preferred solvents are nonpolar, organic solvents. Preferred organic solvents include, but are not limited to, acetone, chloroform, cyclohexane, cyclopentane, dichloromethane, diethyl ether, hexane, pentane, and toluene. In an embodiment of the invention, the concentration of the diamine in solution can between about 0.1 wt. % and about 10 wt. %, preferably about 0.5 wt. % and about 5 wt. %, more preferably about 0.1 wt. % and about 2 wt. %.

Subsequent to either or both reacting steps, the composition can optionally be washed and dried with a solvent such as acetone or toluene. Preferably the solvents has a high relative volatility so that the layers can dry quickly after the deposition. The drying step can be performed in an oven or under a condition to speed up the drying, e.g., under a vacuum. If the washing and drying step is performed, it may be repeated multiple times. The washing step can be performed for a suitable amount of time. For example, the washing step can be performed for a time of about 5 seconds to about 200 seconds, preferably 15 seconds to about 180 seconds, more preferably for about 30 seconds to about 120 seconds.

To form a trilayer, perform the two steps to prepare a bilayer. The bilayer can then be exposed to a solution of additional components capable of crosslinking with the amide linkages, e.g., clay particles, graphene oxide, zeolites. The solution of can be prepared with a suitable solvent capable of dispersing the additional components. Suitable solvents, include, but are not limited to, water, acetic acid, formic acid, phosphoric acid and mixture thereof. During exposure to the solution of additional components with the bilayer, the additional components are physically crosslinked with the amide linkages to form a trilayer. These steps can be repeated to form multiple trilayers over each other. Similarly, the steps to form a bilayer can be repeated to form a bilayer over the bilayer.

The concentration of the additional component in the solution can vary depending on the thickness of the trilayer desired. If the additional component is clay, the clay concentration is preferably between about 0.5 wt. % and about 10 wt. %, preferably about 1 wt. % and about 5 wt. %, more preferably about 0.1 wt. % and about 2 wt. % of the solution. The bilayer can be exposed to the solution of additional components for a time between about 10 seconds to about 600 seconds, preferably from about 15 seconds to about 450 seconds, more preferably from about 20 seconds to about 300 seconds.

Figure 2:
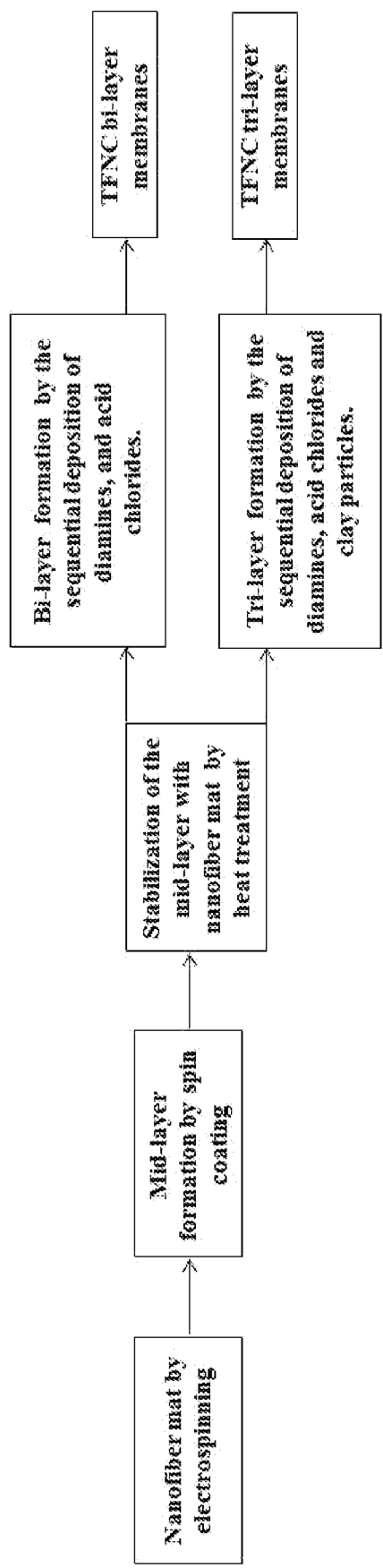
FIG. 2 shows exemplary process diagram of the methods of the invention for the preparation of an exemplary bilayer or trilayer membrane with clay particles.

FIG. 2 shows exemplary process diagram of the methods of the invention for the preparation of an exemplary bilayer or trilayer membrane with clay particles. The method begins by preparing a support layer comprising a nanofibrous mat by electrospinning a polymer and/or oligomer. Spin coating a spin coat polymer and/or oligomer to form a mid-layer on the support layer. Stabilizing the second layer by heating. Forming an outer layer by exposing an acid chloride and diamine to the mid-layer. At this point a bilayer is formed. A trilayer can be formed by exposing the bilayer to clay particles.

Figure 3:
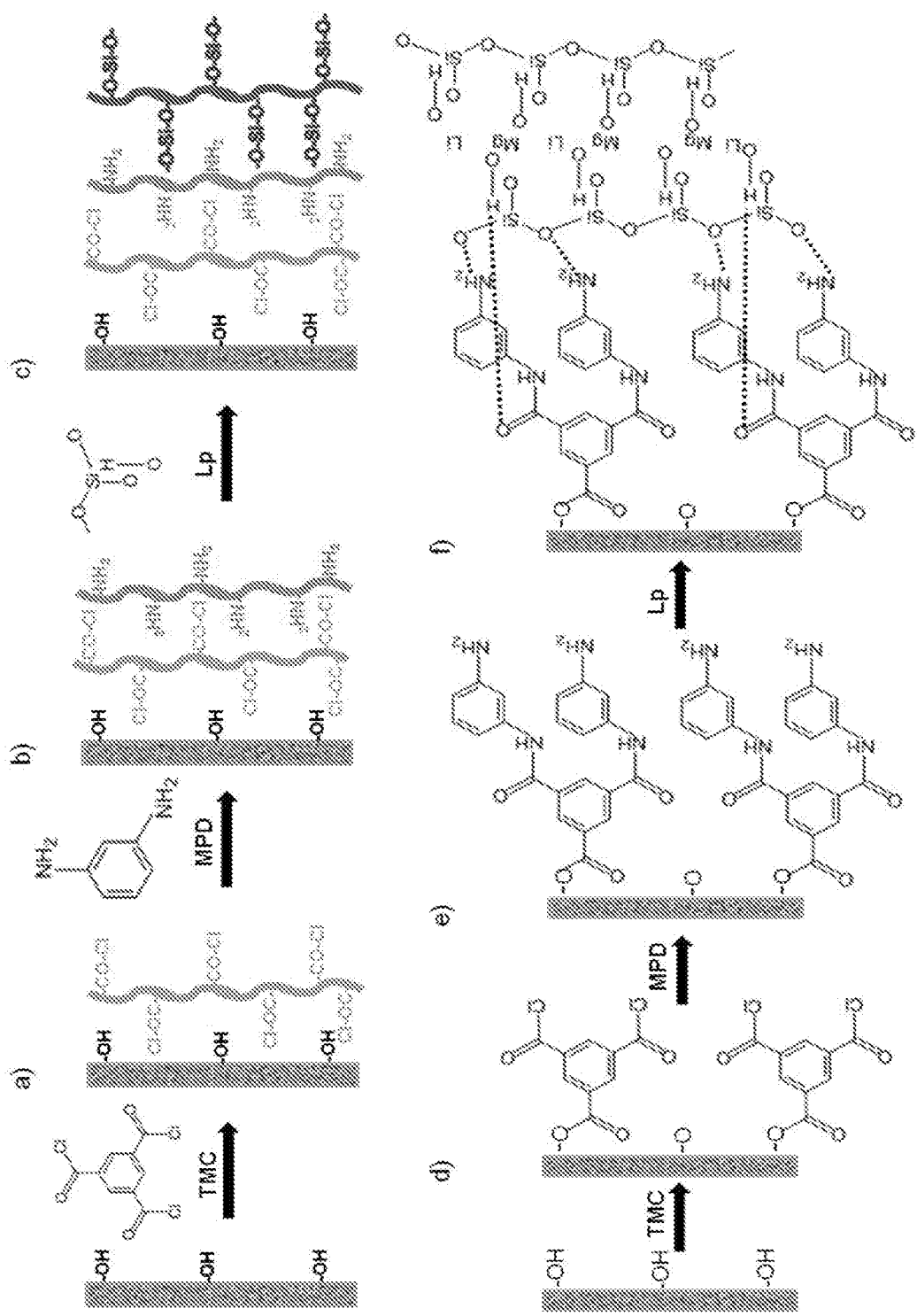
FIGS. 3(a)-3(f) show a schematic view of the sequential steps and chemical interactions involved in the preparation of an exemplary TFNC membrane.

FIGS. 3(a)-3(f) shows a schematic view of the sequential steps and chemical interactions involved in the preparation of an exemplary TFNC membrane. In particular FIG. 3 shows the preparation of a polyacrylonitrile (PAN) thin film nanocomposite membrane by molecular Layer-by-Layer (mLbL) assembly. FIG. 3(a) shows the step of exposing, to a trimethyl chloride (TMC) solution, a spin coated a PAN nanofiber mat spin coated with polyvinvyl alcohol (PVA). FIG. 3(b) shows the TMC modified PAN mat being exposed to a meta-phenylene diamine (MPD) solution to result in the polyamide layer formation completing the formation of a bilayer. FIG. 3(c) shows the nanofiber mat was then exposed to aqueous mixture containing clay particles to form a trilayer. FIGS. 3(d), 3(e) and 3(f) show the chemical interactions involved in FIGS. 3(a), 3(b) and 3(c) respectively. The steps exemplified in FIGS. 3(a)-3(b) and/or 3(a)-3(c) can be repeated for the desired number of "bilayer" and "trilayer" cycles, respectively.

Methods of Using the Compositions

Embodiments of the invention include methods of using the composition, in particular, the membranes. For example, the TFNC membranes can be used as filtration membranes, including, but limited to, ion filtration membranes, ultrafiltration membranes, nanofiltration membranes, reverse osmosis membranes, biological filtration membranes, virus filtration membranes, and protein separation membranes. In aspect of the invention, the TFNC membranes stable in the presence of chlorine. In another aspect of the invention, the TFNC membranes are resistant to fouling.

It has been found that by using the molecular layer-by-layer assembly, deposition from aqueous solutions improves dispersion of nanoparticles and facilitates the relatively high loading of particles within the PA layer (Industrial & Engineering Chemistry Research 2010, 49, 8501-8509). Considering the selectivity of the polymer/particle nanocomposites in gas barrier and separation applications (Chemistry of Materials 2013, 25, 1649-1655 and ACS Applied Materials and Interfaces 2012, 4, 1643-1649), it is expected that a uniform distribution of particles within the PA layer would likely increase the salt rejection in RO by increasing the tortuosity of the diffusion layer.

Methods of using the compositions include, forming a filtration membrane from the TFNCs. Adding the filtration membrane to a filtration system. A filtration system can include a one or more gas and/or liquid handling apparatus. Suitable gas and/or liquid handling apparatuses include, but are not limited to, a column, a tube, a pipe, a liquid container, an inlet, an outlet, a reservoir, and any combination thereof. The filtration membrane can be located within a gas and/or liquid handling apparatus or in fluid communication with a liquid handling apparatus such that the gas and/or liquid passes through the filtration membrane while traveling through the apparatus and/or system. In some embodiments of the invention, the gas and/or liquid handling apparatus will have an inlet and outlet, multiple inlets and/or outlets, or a single opening that serves as both an inlet and an outlet. In embodiments of the invention, multiple gas and/or liquid handling apparatuses can be employed in series and/or parallel. Similarly, multiple filtration membranes can be employed in series and/or in parallel.

Methods of filtering include passing a gas and/or liquid through a filtration membrane of the invention to filter the gas and/or liquid. This can be repeated multiple times with membranes having the same or different properties. Thus, in an aspect of the invention, different membranes can be employed to filter different items. For example, a first filtration membrane may remove certain ions and a second filtration membrane may remove a biological material, e.g., a protein. In an aspect of the invention, the filtration step can be performed in a cascade.

All publications and patent applications in this specification are indicative of the level of ordinary skill in the art to which this invention pertains. All publications and patent applications are herein incorporated by reference to the same extent as if each individual publication or patent application was specifically and individually indicated as incorporated by reference.

EXAMPLES

Embodiments of the present invention are further defined in the following non-limiting Examples. It should be understood that these Examples, while indicating certain embodiments of the invention, are given by way of illustration only. From the above discussion and these Examples, one skilled in the art can ascertain the essential characteristics of this invention, and without departing from the spirit and scope thereof, can make various changes and modifications of the embodiments of the invention to adapt it to various usages and conditions. Thus, various modifications of the embodiments of the invention, in addition to those shown and described herein, will be apparent to those skilled in the art from the foregoing description. Such modifications are also intended to fall within the scope of the appended claims.

The following Examples were performed using exemplary chemicals and components for the purpose of example. Thus, embodiments of the invention should not be limited to the materials used herein. Polyacrylonitrile (PAN, Mw=150,000 g/mol), polyvinyl alcohol (PVA, Mw=90,000 g/mol), 1,3,5-benzenetricarbonyl trichloride (trimesoyl chloride, TMC, 98%), polyethylene glycol diglycidyl ether (PEGDGE, Mn~500), bovine serum albumin, sodium hypochlorite (NaOCl, chlorine content 4.00-4.99%), N,N-dimethyl formamide (DMF), $MgCl_2$ and NaCl were obtained from Sigma Aldrich, St. Louis, USA. m-phenylene diamine (MPD, 99%) was procured from Acros Organics, N.J., USA. Toluene and acetone (ACS grade, 99.5%) were purchased from Fisher Chemicals, USA. Laponite RD, a synthetic smectic clay with a relative density of 2.53 $g/cm^3$ was obtained as gift sample from BYK additives Inc. Gonzales, Tex., USA. Crane calendered polypropylene/polyethylene nonwoven microporous substrate used as the support was provided as gift sample by NEENAH Technical Materials, Mass., USA. All chemicals were used without any further purification. Deionized water (DI) was used for all solution preparation.

EXAMPLE 1

Preparation of Thin Film Nanocomposites

Figure 4:
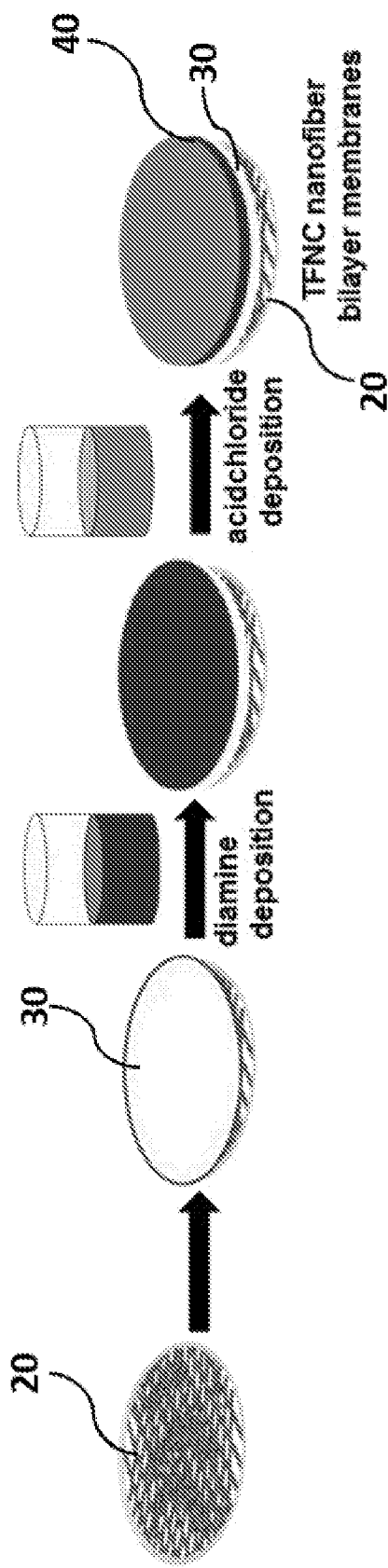
FIG. 4 is a schematic drawing of the steps involved in the preparation of TFNC membranes with bilayer structure.
Figure 5:
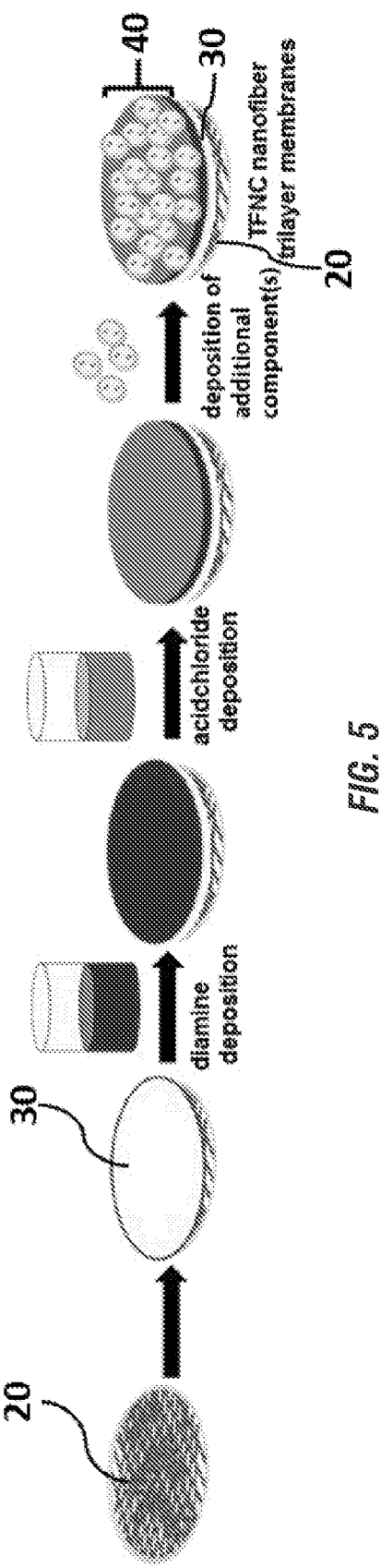
FIG. 5 is a schematic drawing of the steps involved in the preparation of TFNC membranes with trilayer structure.

TFNC nanofiber membranes were prepared according to the exemplary methods shown in FIG. 4 (bilayer) and FIG. 5 (trilayer). The following description describes the components and processes used in performing the methods of FIGS. 4 and 5 and are not limiting. The porous nanofiberous support was prepared by electrospinning. A 10 wt. % PAN solution in DMF was prepared first. Subsequently, the solution was filled in a 30 mL BD Luer-Lok tip plastic syringe having a stainless-steel needle with 18 gauge 90° blunt end. The electrospinning setup included a high voltage power supply (Gamma High Voltage Research, Inc., Ormond Beach, Fla.) and a laboratory-produced roller with diameter of 25 cm. During electrospinning, a positive DC high voltage of 16 kV was applied to the needle that was placed 25 cm away from the surface of roller. The roller was covered with aluminum foil, and the rotational speed during electrospinning was set at 100 rpm. The flow rate of 1.0 mL/h was maintained by using a digitally controlled syringe pump (KD Scientific Inc., Holliston, Mass.). The as-electrospun PAN nanofibers were collected as overlaid mat on aluminum foil, and the nanofiber mat could be easily peeled off from the aluminum foil.

Surface of the nanofiber mat was first activated with appropriate —OH reactive functionality by forming a thin layer of spin coated with 3 wt. % aqueous solution of PVA in a mixture solvent of $H_2O$/PEGDGE (with composition of 85/15) at 500 rpm for 20 s. After drying the PVA layer, the PAN/PVA nanofiber mat was sandwiched between two glass slides and crosslinked by heating at 80° C. for 24 h.

Nanofiber based thin film composite (TFC) membranes were prepared by forming separating layers of polyamide (PA) on PAN nanofiber mat by mLbL. The obtained —OH functionalized nanofiber mats were exposed to a 1 wt. % solution of trimesoyl chloride (TMC), which reacted with —OH groups to form stable ester linkages. After this step, the nanofiber mats were washed in acetone twice with acetone for 30 seconds each time and dried in compressed air to remove the loosely adsorbed monomers from the surface. This TMC coated surface was then exposed to the a 1 wt. % solution of meta-phenylenediamine (MPD), which reacted with the acid chloride groups of TMC to form amide linkages. Removal of the loosely bound MPD monomers by washing in acetone twice for 30 seconds each time, completing the formation of a "TMC/MPD bilayer" structure on a PAN nanofiber mat.

Thereafter, this bilayer modified nanofiber mat was exposed to a 1 wt. % aqueous solution of laponite nanoparticles (Lp) for 3 minutes and then washed twice with DI water for 1 min each time. After the Lp deposition step, the membranes were thoroughly dried by blowing air to avoid the precipitation of TMC in water in the subsequent steps. The Lp particles would be physically crosslinked with the amide linkages to form a "TMC/MPD/Lp trilayer" structure. These three steps were then repeated to form 3, 4, 5 and 6 number of trilayers on nanofiber mats/membranes. TFNC nanofiber membranes with 8, 10, 12 and 14 TMC/MPD bilayers were also prepared.

A field-emission scanning electron microscope (FESEM, ZEISS Supra40) was used to study the surface morphology of the electrospun PAN nanofiber mats and the cross-sections of the TFNC membranes. Thin sections of the TFNC membranes were placed on specimen mounts and were sputter coated with gold to avoid charge accumulations, and SEM micrographs were recorded at 3 kV. An atomic force microscope (AFM, Bruker Multimode 8HR) in tapping mode was used to study the surface patterns of nanofibers after mLbL modification. Cross sections of the selective layers of laponite incorporated TFC nanofiber membranes were obtained using a transmission electron microscopy (TEM, JEOL JEM-2100) at an operating voltage of 200 kV. For TEM, the TFC membrane was first embedded in an epoxy resin by heating at 60° C. for 24 h and thin sections of the TFC membrane were then obtained by an ultramicrotome (RMC PowerTome XL).

X-ray diffraction (XRD) patterns of the laponite powder, PAN nanofiber mat and TFC nanofiber membranes were recorded using an X-ray diffractometer (Multipurpose Rigaku Ultima Plus). The diffractograms were measured at a diffraction angle, $2\theta$, in the range of 2.5 to 30° with a $2\theta$ step of 0.02° using Cu K$\alpha$ radiation ($\lambda$=1.5406 Å). FTIR spectra of the PAN nanofiber mat and nanofiber TFC membranes were recorded in the wavenumber range of 4000-400 $cm^{-1}$ using ATR-FTIR spectroscopy (Agilent Technologies, Cary 660). A fITA Foram X3 multi-wavelength Raman spectrometer was used to acquire Raman scattering spectra over a range of 200-2200 $cm^{-1}$, with a resolution of 4 $cm^{-1}$, using a backscattering configuration using a 40× objective excited with a 532 nm laser diode.

The polymeric nanofiber mat used as substrate for the TFC membrane preparation had fiber diameters of 130-150 nm as shown FIG. 6(a). Spin coating on the nanofiber mat covered the void spaces at the mat surface between adjacent nanofibers, without penetrating inside the mat, as evidenced by its cross sectional view in FIG. 6(b). This mid-layer formed with polyvinylalcohol or carboxy methyl chitosan was essential both to activate the nanofiber surface with reactive —OH functional groups and to prevent the entry of monomers into the nanofiber mat during the subsequent mLbL process.

Figure 8:
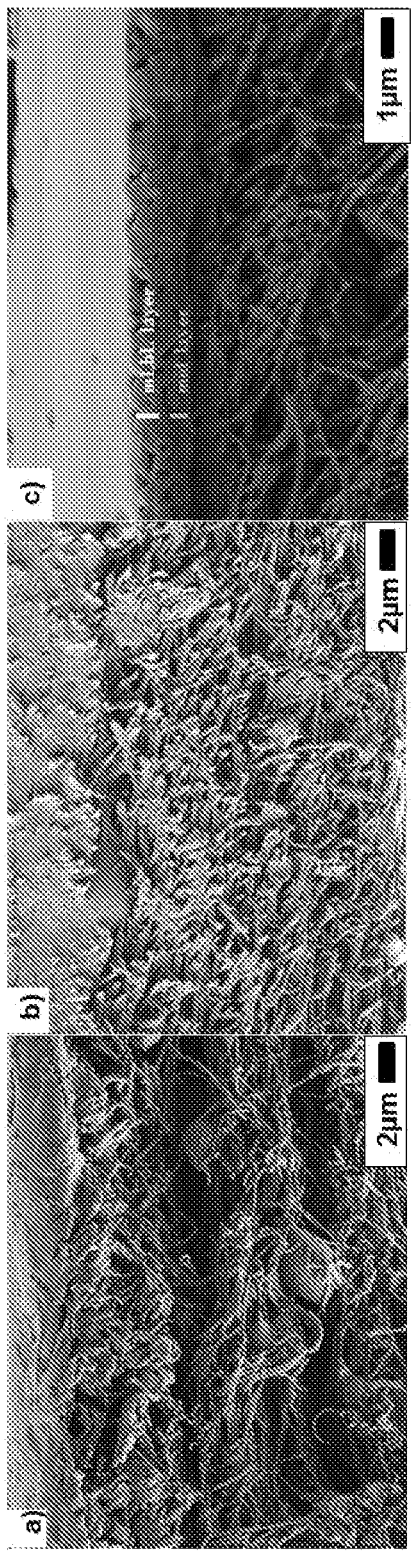
FIGS. 8(a)-8(c) are scanning electron microscope images showing the morphologies of TFNC nanofibrous membranes prepared by molecular layer-by-layer (mLbL) assembly with 8(a) showing three trilayers, 8(b) showing four trilayers, and 8(c) showing six trilayers.

FIGS. 7(a)-7(c) show the cross sectional view of the nanofiber TFNC bilayer membrane with 8, 12 and 14 bilayers of TMC/MPD. A distinct defect free selective layer was visible without affecting the porous nature of nanofiber mat with the layer thickness of approximately 200-220 nm. FIGS. 8(a)-8(c) shows the cross sectional view of the TFNC trilayer nanofiber membrane with 3, 4 and 6 trilayers TMC/MPD/Lp respectively. However, TFNC membrane prepared from trilayers of TMC/MPD/Lp provided a thicker layer of 500-520 nm, illustrating an exponential growth. The linear growth observed for the bilayer system was approximately 9.2 nm per layer and exponential growth observed for the trilayer system was approximately 28.9 nm per layer. Measurements were calculated from SEM images. Given the growth it was worth considering what caused the faster growth of the separating layer in presence of Lp particles.

Figure 9:
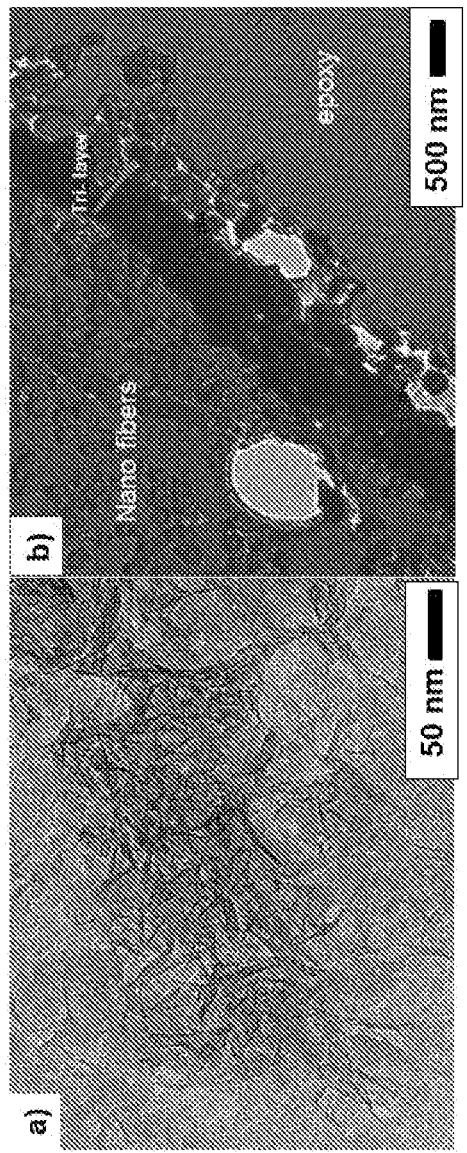
FIG. 9(a) is a transmission electron microscopy image of the clay nanoparticles used for the preparation of TFNC membranes in the present invention.

The transmission electron micrograph shown in FIG. 9(a) confirmed that Lp particles used for the trilayer formation had a thickness of approximately 1 nm and an diameter of approximate 20-30 nm. These dimensions were in close agreement with the values reported in the literature (RSC Advances 2015, 5, 21550-21557). Considering the dimensions of Lp, the faster growth observed in presence of Lp particles indicated that the buildup of trilayers was not because of the uniformly deposited layers, but rather, multiple layers were formed due to the interlayer diffusion of Lp particles more deeply into the previously formed polyamide layer and crosslinked with the adjacent monomers to form a stable structure.

A cross sectional TEM image of the TFC nanofiber membrane given in FIG. 9(b) shows a compact depth homogenous structure illustrating the formation of a highly crosslinked selective layer. However, the thickness growth observed during the selective layer formation in our preparation method was not in agreement with the values reported in the literature (Advanced Materials 2013, 25, 4778-4782). mLbL deposition with TMC/MPD on a silicon wafer by Johnson et. al have shown a growth rate of 0.9 nm per cycle for a 10 s deposition time (Journal of Polymer Science Part B: Polymer Physics 2012, 50, 168-173). Thus, the higher growth rate observed in our system may be due to the longer deposition time employed and the favorable chemical interaction involved with the polymer substrate which leads to multilayer deposition.

Figure 10:
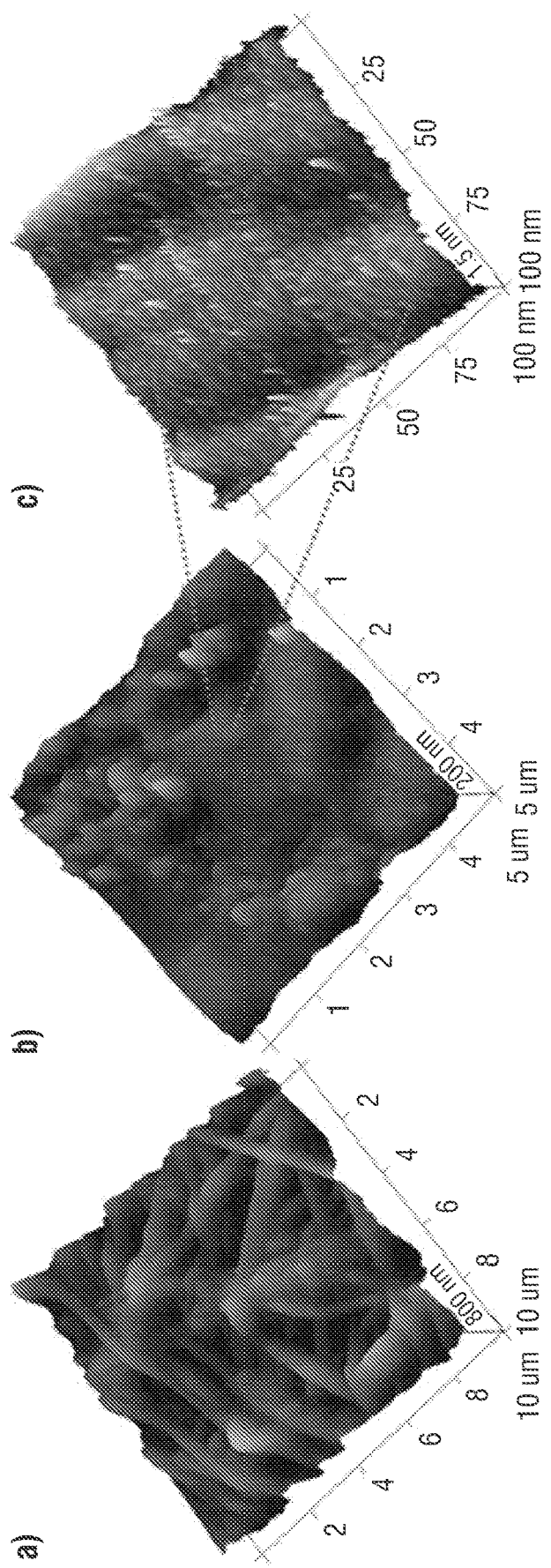
FIGS. 10(a)-10(c) are atomic force microscopic images showing the morphologies of the TFNC membranes during two stages of the preparation. 8(a) shows the nanofiber mat after the formation of mid-layer by spin coating. 8(b) shows the TFNC membrane with six trilayers, and 8(c) a close in image of the TFNC membrane with six trilayers.

Three dimensional (3-D) AFM images of the PAN nanofiber mat coated with a polyvinyl alcohol or carboxy methyl chitosan mid layer and TFNC membranes formed from 6 trilayers are shown in FIGS. 10(a)-10(c). In FIG. 10(a), interstitial voids among the nanofibers are partially plugged with PVA which could be seen as solid fillings between the nanofibers (10×10 μm). FIG. 10(b) of the TFC membranes formed from 6 trilayers, even in a half scan size (5×5 μm) compared to that of the mid layer coated PAN, showed a smooth thin layer with uniform grain size, indicating the formation of a defect free separating layer on the PAN nanofiber mat. A higher magnification image (FIG. 10(c)) of the TFNC membranes at a scan size of 100×100 nm has shown grains/spikes of uniform size, likely due to the uniform spatial distribution of Lp particles within polyamide trilayer.

EXAMPLE 2

Separation Performance of Thin Film Nanocomposite Membranes

Figure 11:
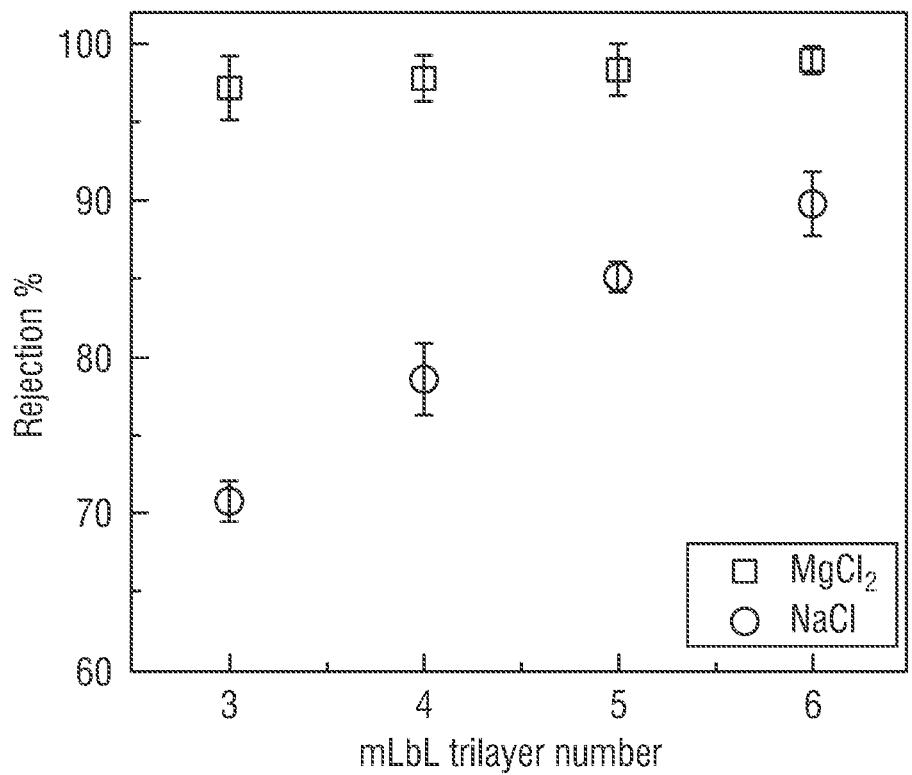
FIG. 11 is a plot of pure water flux at an applied pressure of 10 bar of the TFNC nanofiber trilayer membranes as a function of number of trilayers in the selective layer.
Figure 12:
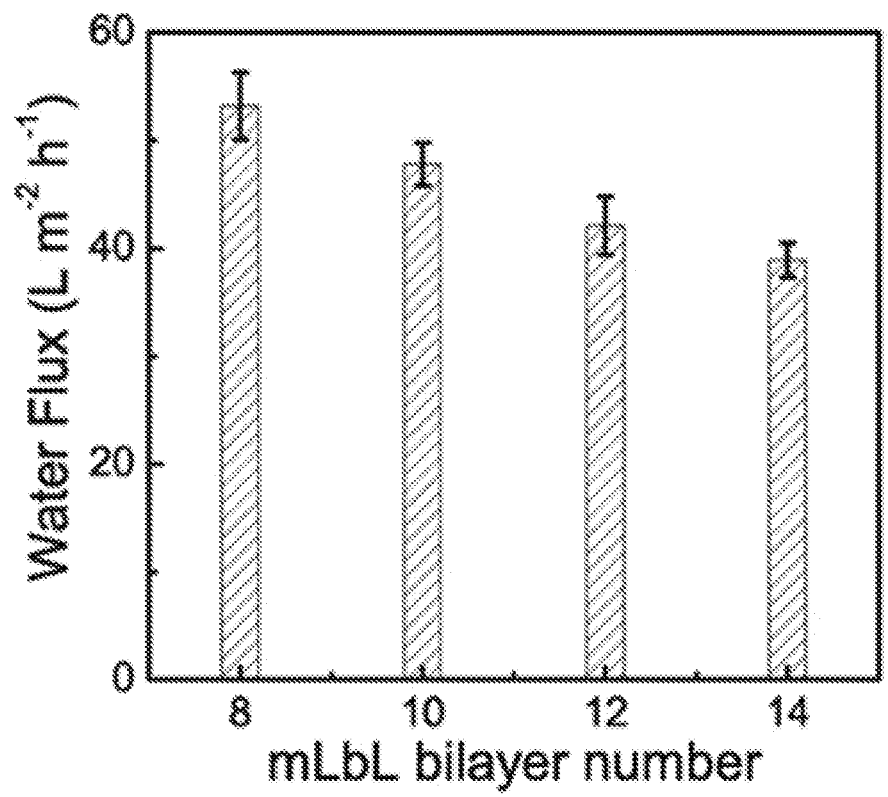
FIG. 12 is the graph showing the salt rejection behavior of the TFNC nanofiber trilayer membranes as a function of number of trilayers in the selective layer at an applied pressure of 10 bar.

The separation performances of the TFNC nanofiber membranes were evaluated in dead end filtration mode at an applied pressure of 10 bar. The water flux and salt rejection values of the TFNC trilayer membranes reported in FIG. 11 varied significantly as a function of trilayer number. These membranes exhibited a water flux of 44.5 $Lm^{-2}h^{-1}$ with 3 trilayers, which decreased to 25.8 $Lm^{-2}h^{-1}$ with 6 trilayers of TMC/MPD/Lp. However as shown in FIG. 12, with the increase of trilayer number, steady increase in the rejection of divalent $MgCl_2$ and monovalent NaCl were observed. TFNC nanofiber membranes modified with 6 trilayers showed a $MgCl_2$ rejection of 99.1% and NaCl rejection of 89.8%.

Figure 13:
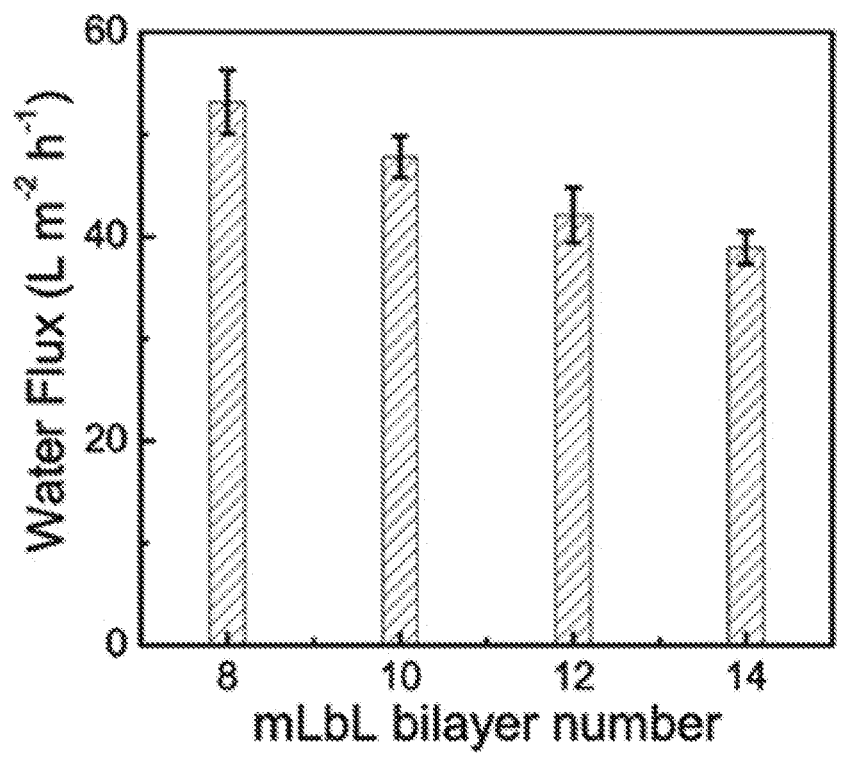
FIG. 13 depicts the pure water flux of the TFNC nanofiber bilayer membranes as a function of bi-layer of number in the selective layer at an applied pressure of 10 bar.
Figure 14:
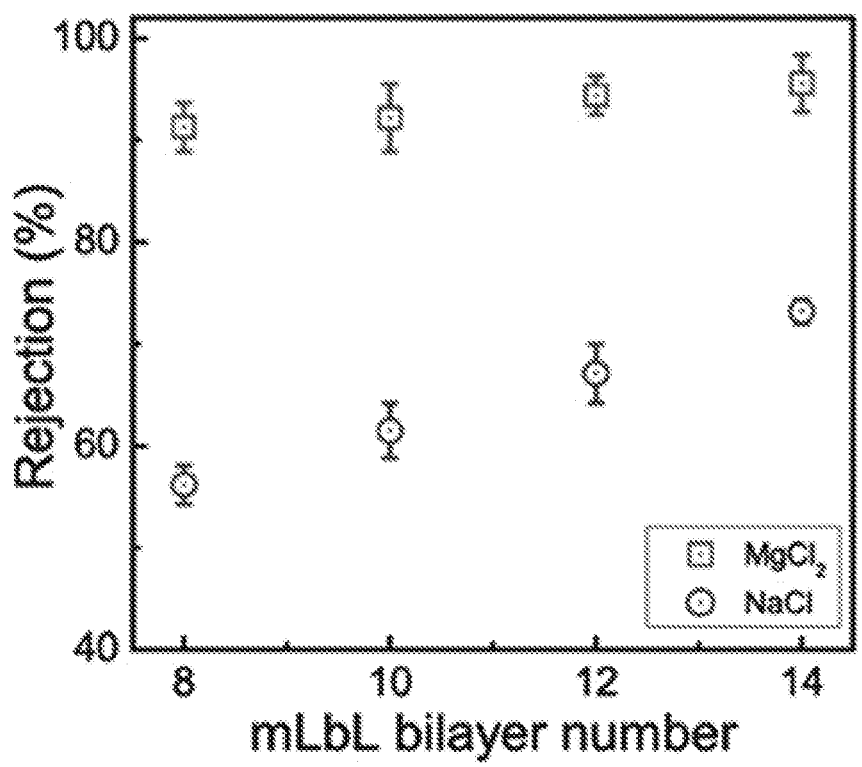
FIG. 14 displays the plot of salt rejection behavior of the TFNC nanofiber bilayer membranes as a function of number of bilayers at an applied pressure of 10 bar.

This decrease in water flux and increase in salt rejection could be justified by the enhancement of polymer concentration on the nanofiber mat surface with an increase in trilayer number. Upon comparison with the separation performance of TFNC nanofiber membranes modified with TMC/MPD bilayers (FIG. 13 and FIG. 14), it was concluded that the rejection of trilayer modified nanofiber membranes was significantly higher, even with fewer total layers. Also a faster rate of increase in rejection was evident due to the increase in tortuosity within the selective layer induced by Lp particles, resulting in a longer diffusive path for hydrated ions.

The commercial TFC polyamide (Dow Filmtec, BW30-HR) membranes tested under similar experimental conditions showed the water flux of 17.2 $Lm^{-2}h^{-1}$ and the NaCl rejection of 96.8%. The high PWF observed for the TFNC nanofiber membranes is due to the high porosity of the nanofiber mat substrate used, which offers low resistance to water flow. Though the NaCl rejection of mLbL trilayer modified nanofiber membranes was lower, it is anticipated that these values can be improved significantly with further optimization studies.

Considering the high water flux of 25.8 $Lm^{-2}h^{-1}$ with moderate rejection of 89.8% for monovalent NaCl, it might be reasonable to speculate that nanochannels formed by the incorporation of laponite nanoparticles between the polyamide layers was effective in selectively rejecting the solvated ions by size exclusion. This speculation could be corroborated by the interplanar laponite spacing of 0.92 nm observed in our XRD pattern of TFNC nanofiber membranes. Therefore, these nanochannels with diameters of approximately 1 nm formed in these nanofiber membranes would be capable of selectively removing solvated ions, as this value is between the hydrodynamic size of a water molecule and solvated monovalent ions (Journal Membrane Science 2014, 454, 516-537). Similar rejection behavior with strong dependence on the nature of monomers used for the mLbL deposition was reported in the literature by Qian et. al. A microporous support modified with tetrafunctional amine and tetrafunctional acid chloride showed a higher divalent rejection and relatively low monovalent rejection ($R_{NaCl}$=46%) (Langmuir 2012, 28, 17803-17810). This was due to the high fractional free volume of the selective layer network because of the large monomers used in mLbL deposition. In another study, Gu et. al modified a standard asymmetric support membrane with m-phenylenediamine and trimesoyl chloride using mLbL ACS Nano 2015, 9 (1), 345-355.

These membranes exhibited excellent water flux of 21.5 $Lm^{-2}h^{-1}$ at an applied pressure of 15.5 bar and a monovalent NaCl rejection of 98.7%. However, the film growth observed for these systems was only 2-3 nm per cycle, and thus deposition conditions employed in their studies were either not industrially useful or need a higher number of deposition cycles to form a defect free selective layer in a nanofibrous support. As comparison, as shown in our morphological results, TMC/MPD/Lp multilayers would grow exponentially forming a defect free selective layer on a nanofibrous support that could be used for RO applications. Such a rapid growth observed with a minimum number of deposition cycles is an exciting result for those interested in using this technique within a commercial production unit.

EXAMPLE 3

Figure 15:
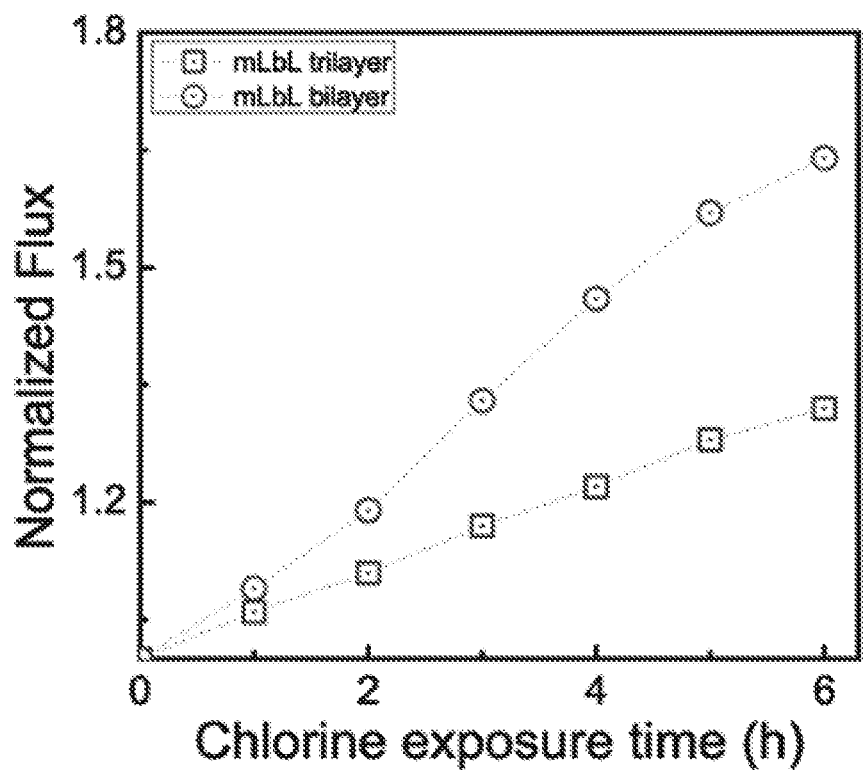
FIG. 15 depicts the chlorine stability of nanofiber TFNC membranes prepared with bilayers and trilayers in terms of normalized flux, which is a ratio of pure water flux (PWF) after exposed to free chlorine to the initial PWF, as a function of chlorine exposure time.
Figure 16:
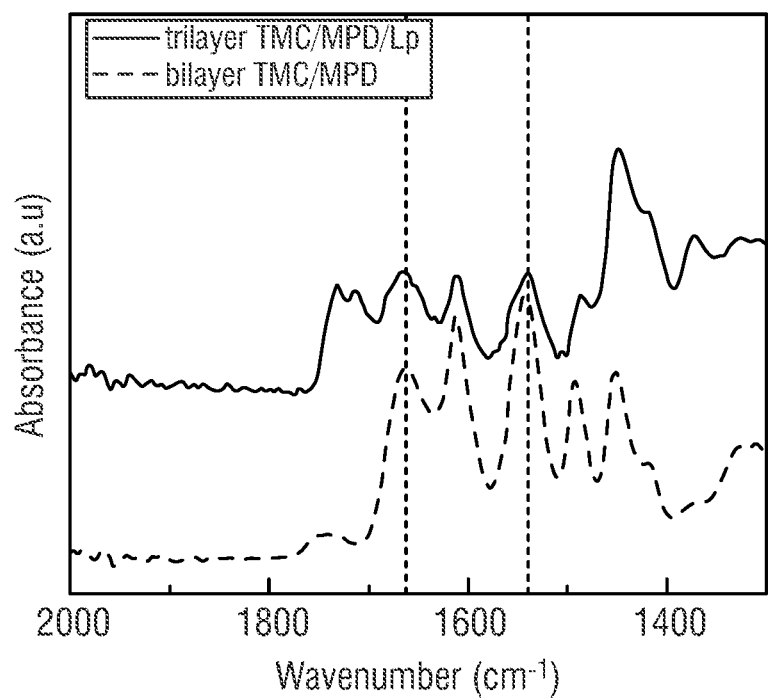
FIG. 16 is the FT-IR spectra of the virgin nanofiber TFNC membranes before exposing to free chlorine for six hours.
Figure 17:
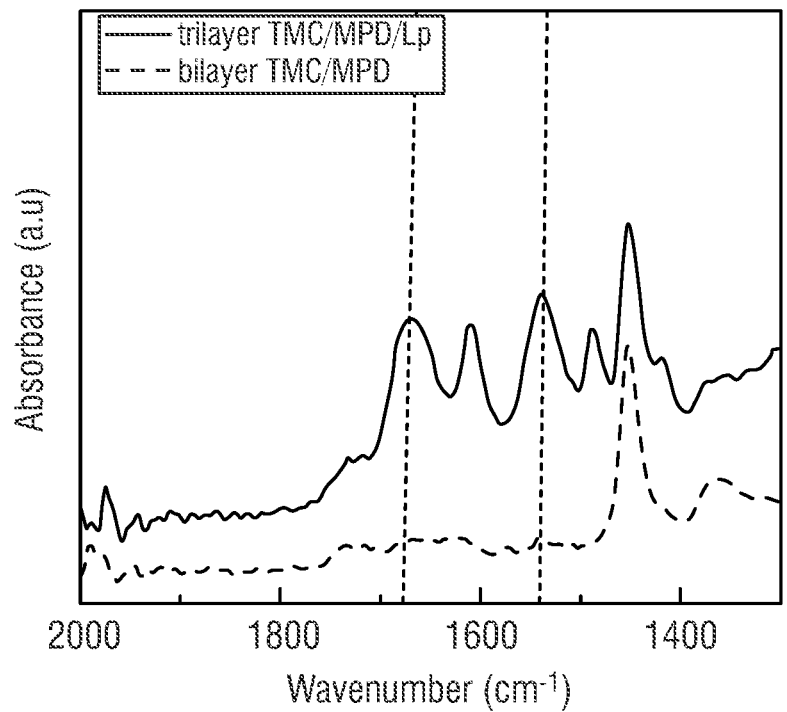
FIG. 17 is the FT-IR spectra of the nanofiber TFNC membranes after exposing to free chlorine for six hours.

Chlorine Stability and Fouling Propensity of the Thin Film Nanocomposite Membranes Chlorine stability of the TFNC nanofiber membranes was studied by immersing the membranes in sodium hypochlorite solution at a concentration of 4 $gL^{-1}$ at pH 8.0. Chlorine stability at the basic pH was then evaluated in terms of normalized water flux, which is ratio of water flux of the chlorine treated membranes to the virgin membrane, as a function of chlorine exposure time. As seen in FIG. 15, the TMC/MPD bilayer modified membranes showed a significantly higher normalized flux compared to the trilayer modified membranes, indicating the susceptibility of the pure polyamide linkage or TMC/MPD bilayer membrane to free chlorine attack. FT-IR spectroscopy was used to elucidate the structural rearrangements that occurred for both types of TFNC nanofiber membranes upon chlorine exposure. FIGS. 16 and 17 represent the FT-IR spectra of the TFNC nanofiber membranes before and after chlorine exposure respectively.

Comparison between the FT-IR spectra of the before and after chlorine exposure (FIGS. 16 and 17) revealed that the —N—H bending band at 1540 $cm^{-1}$ and the C=O stretching band at 1660 $cm^{-1}$ of the polyamide layer disappeared in the bilayer modified TFNC membranes while the corresponding bands for the trilayer membranes were unaltered. According to the literature, structural degradation was caused during N-chlorination by replacing the amine nitrogen and the resulting ring chlorination led to polyamide chain scission (Journal of Membrane Science 2014, 469, 397-409). In our bilayer mLbL modification, deposition was terminated with MPD and these basic amine groups were easily oxidized by active chlorine. On the other hand, it was observed that the crosslinked structure formed between laponite and polyamide layers in trilayer modified TFC membranes were more stable than the polyamide even at the basic pH, which might be due to the inaccessibility of the amine proton for exchange with free chlorine atoms.

Figure 18:
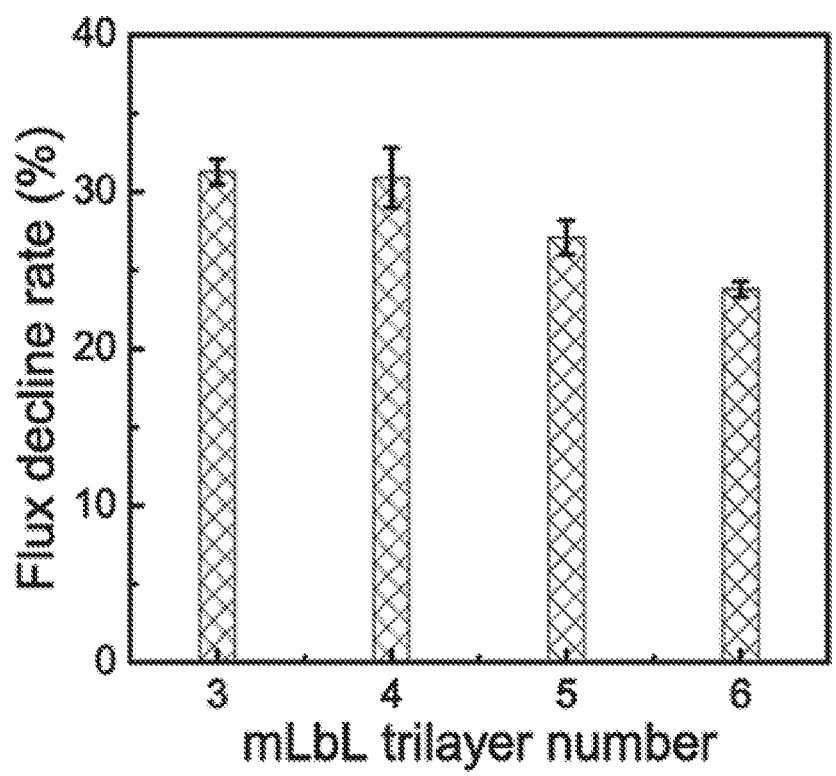
FIG. 18 showing the flux decline behavior of the TFNC nanofiber trilayer membranes after filtering bovine serum albumin model foulant solution for six hours.
Figure 19:
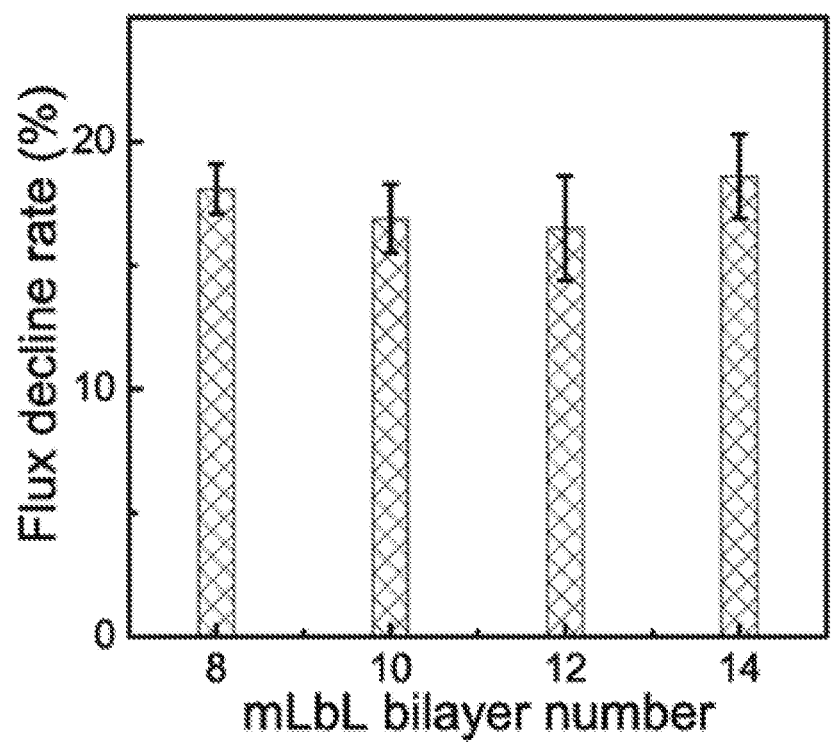
FIG. 19 depicts the flux decline behavior of the TFNC nanofiber bilayer membranes after filtering bovine serum albumin model foulant solution for six hours.

Since the trilayer and bilayer structures formed on the TFNC nanofiber membranes were prepared from different monomer combinations and had different resultant morphologies, these membranes were evaluated to determine how the final chemical composition and morphology affected fouling behavior. The fouling propensity of the TFNC nanofiber membranes were evaluated in terms of flux decline rate ($R_{fd}$) by filtering BSA solution for 6 hours. FIGS. 18 and 19 represent the flux decline rate ($R_{fd}$) of the TFNC nanofiber membranes with trilayer and bilayer structure respectively.

By comparing the $R_{fd}$ data presented in FIG. 18 and FIG. 19, it was revealed that the trilayer modified TFNC membranes were more susceptible to fouling than the bilayer modified membranes. Considering the smoother surface observed in SEM image and high hydrophilicity of laponite particles, the exact reasons for the higher fouling propensity of trilayer modified membranes were not clearly understood. However, probable reasons for higher fouling propensity were (i) the absence of surface charge/electrostatic effect in the trilayer structure due to the termination of separating layer build up with laponite decreased surface repulsion of the BSA and (ii) nanochannels formed within the Lp trilayer structure were effective at retaining/trapping solute molecules that came in to contact with the membranes.

A detailed comparative evaluation of the performance of the nanofiber multilayer nanocomposite membranes developed in this study with recently reported NF/RO membranes in the literature (table in the supporting information, manuscript). The pure water flux of the newly developed TFC nanofiber membranes with mLbL trilayers was higher than the commercial RO membranes (Dow Filmtec, BW30-HR) and similar multilayers formed on an asymmetric polymeric support Advanced Materials 2013, 25 (34), 4778-4782. Also, the membranes presented herein showed improved performance relative to other recent developments in RO literature (including graphene and graphene oxide modified membranes) ACS Applied Materials and Interfaces 2015, 7 (7), 4381-4389. The higher flux with comparable rejection capability of TFNC multilayer nanofiber membranes was likely due to the combined effect of the size of the nanochannels in the separating layer and the high porosity of the nanofiber mat support. Thus the rapid film growth observed in the mLbL deposition and the excellent separation performance of resultant TFNC membranes would be exciting for those interested to use this technique in a commercial production unit.

The inventions being thus described, it will be obvious that the same may be varied in many ways. Such variations are not to be regarded as a departure from the spirit and scope of the inventions and all such modifications are intended to be included within the scope of the following claims. The above specification provides a description of the manufacture and use of the disclosed compositions and methods. Since many embodiments can be made without departing from the spirit and scope of the invention, the invention resides in the claims.

What is claimed is:

1. A method of preparing a composition comprising:
    obtaining a support layer, wherein the support layer is a porous nanofibrous mat, matrix, scaffold, weave, or combination thereof;
    coating a polymer and/or oligomer on the support layer to form a mid-layer on the support layer;
    forming an outer layer on the mid-layer, wherein the outer layer consists of three to six trilayers, wherein each trilayer consists of a polyamide bilayer and laponite nanoparticles, wherein the trilayer is formed by exposing an acid chloride and diamine to the mid-layer to form the polyamide bilayer and reacting the bilayer with the laponite nanoparticles in a molecular layer-by-layer assembly, wherein the trilayers grow exponentially to provide an outer layer thickness of between about 200 nm and about 4000 nm.

2. The method of claim 1, wherein the coating step is spin-coating, blade coating, spray coating, slot-die coating, slide coating, dip coating, or a combination thereof; and
    further comprising an optional washing step after the coating step and/or after the forming step.

3. The method of claim 1, wherein the obtaining step is performed by electrospinning an electrospinning spin dope solution comprising an electrospun polymer and/or oligomer in a concentration of between about 1 wt. % and about 30 wt. % of a polymer and/or oligomer.

4. The method of claim 3, wherein the electrospun polymer and/or oligomer comprises cellulose acetate, cellulose, cellulose acetate butyrate, polyacrylonitrile, polyvinylalcohol, polysulphone, polyethersulfone, or a combination or mixture thereof.

5. The method of claim 1, wherein the coating step further comprises crosslinking the polymer and/or oligomer with a crosslinking agent, wherein the crosslinking agent comprises polyethyleneglycol diglycydyl ether, glutaraldehyde, succinic acid, and/or epichlorohydrin.

6. The method of claim 2, wherein the coating step is performed by spin coating step with a spin dope having a concentration of polymer and/or oligomer between about 0.5 wt. % and about 20 wt. % polymer and/or oligomer.

7. The method of claim 6, wherein the spin coating is performed at speed of between about 200 rpm and about 3000 rpm for a time between about 10 seconds and about 300 seconds; and wherein the spin coating polymer and/or oligomer comprises polyvinylalcohol, chitosan, cellulose acetate, cellulose acetate butyrate, polymethylmethacrylate, and combinations or mixtures thereof.

8. The method of claim 5, wherein the crosslinking occurs by in situ polymerization, heat treatment, pressurization, pH modification, or radiation exposure.

9. The method of claim 1, wherein the acid chloride is exposed to the mid-layer for a time between about 10 seconds and about 300 seconds; and wherein the diamine is exposed to the mid-layer for a time between about 10 seconds and about 300 seconds.

10. The method of claim 1, wherein the acid chloride is in a solution having a concentration of about 0.1 wt. % to about 20 wt. %; wherein the diamine is in a solution having a concentration of about 0.1 wt. % to about 20 wt. %.

11. A composition prepared by the method of claim 1.

12. The composition of claim 11, wherein the composition is a filtration membrane; and wherein the support layer has a porosity of at least about 70%; wherein the nanofibrous mat comprises nanofibers having a diameter of between about 10 nm and about 2500 nm; and wherein the mid-layer has a thickness of between about 100 nm and about 500 nm.

13. A filtration system comprising:
    the composition of claim 11; and
    one or more gas and/or liquid handling apparatuses, wherein the filtration membrane is contained within at least one gas and/or liquid handling apparatus.

14. The filtration system of claim 13, wherein the filtration membrane is an ion filtration membrane, an ultrafiltration membrane, a nanofiltration membrane, a reverse osmosis membrane, and/or a biological filtration membrane.

15. The filtration system of claim 13, wherein the one or more gas and/or liquid handling apparatuses include at least one of a column, a tube, a pipe, a liquid container, an inlet, an outlet, and a reservoir.

16. The filtration system of claim 15, wherein the system has multiple gas and/or liquid handling apparatuses in parallel and/or series.

* * * * *